(12) United States Patent
Colson

(10) Patent No.: US 8,082,916 B2
(45) Date of Patent: Dec. 27, 2011

(54) SOLAR HEATING BLOCKS

(75) Inventor: Wendell B. Colson, Weston, MA (US)

(73) Assignee: Hunter Douglas Industries B.V., Rotterdam (NL)

( * ) Notice: Subject to any disclaimer, the term of this patent is extended or adjusted under 35 U.S.C. 154(b) by 445 days.

(21) Appl. No.: 12/226,078

(22) PCT Filed: Apr. 5, 2007

(86) PCT No.: PCT/US2007/008616
§ 371 (c)(1),
(2), (4) Date: Oct. 6, 2008

(87) PCT Pub. No.: WO2008/054497
PCT Pub. Date: May 8, 2008

(65) Prior Publication Data
US 2010/0154783 A1    Jun. 24, 2010

Related U.S. Application Data

(60) Provisional application No. 60/790,464, filed on Apr. 7, 2006.

(51) Int. Cl.
*F24J 2/42* (2006.01)
(52) U.S. Cl. ......... 126/619; 126/678; 126/617; 126/400
(58) Field of Classification Search ............... 126/619, 126/678, 617, 400, 633, 569
See application file for complete search history.

(56) References Cited

U.S. PATENT DOCUMENTS

| | | | | |
|---|---|---|---|---|
| 4,069,809 | A | * | 1/1978 | Strand ............... 126/630 |
| 4,508,099 | A | * | 4/1985 | Clavier ............. 126/400 |
| 4,532,917 | A | * | 8/1985 | Taff et al. ......... 126/618 |

* cited by examiner

*Primary Examiner* — Alfred Basichas
(74) *Attorney, Agent, or Firm* — Day Pitney LLP

(57) ABSTRACT

A solar heating block, designed for use in assembling solar heating panels in the walls of buildings, has a first compartment and a second compartment within its interior volume. The first compartment contains a translucent insulating material, such as an aerogel. The second compartment, which is inward of the solar heating block from the first compartment, contains a heat-absorbing material. The translucent insulating material allows light to be transmitted through the solar heating block, but reduces heat loss to the exterior of the building from the heat-absorbing material.

94 Claims, 18 Drawing Sheets

SOLAR HEATING BLOCKS

CROSS-REFERENCE TO RELATED APPLICATIONS

This application is the U.S. National Stage of International Application No. PCT/US2007/008616, filed Apr. 5, 2007, which includes a claim for priority based on U.S. Patent Application Ser. No. 60/790,464, filed Apr. 7, 2006.

BACKGROUND OF THE INVENTION

1. Field of the Invention

The present invention relates to the field of passive solar energy heating units which may be installed in building walls in the manner of windows.

2. Description of the Related Art

Passive solar heating units of the subject type are known in the art. For example, U.S. Pat. No. 4,532,917 to Taff et al. shows a modular passive solar energy heating unit for heating an enclosed space. The unit employs phase change heat storage material, which is optically transparent to visible light when in a high-stored-energy liquid state, enabling a viewer to see through clearly, and which is translucent milky white when in a low-stored-energy solid state for providing pleasant illumination to the enclosed space when first illuminated by sunlight in the morning.

An undesirable characteristic of this and other such modular passive solar energy heating units of the prior art is their tendency to radiate too much of the heat stored during the daylight hours back outside the building at night. As a consequence, less of the stored heat remains available to heat the building at night. In addition, the heat that does remain to be transmitted into the building does so too quickly, with the result that its benefit is felt for only a relatively short time.

The present invention provides a solution to these and other problems of the prior art.

SUMMARY OF THE INVENTION

Accordingly, the present invention is a solar heating block which is designed for assembling a solar heating panel in the wall of a building. The solar heating block is an insulating, infrared-absorbing, light-diffusing block and has a top, a bottom, a first side, a second side, a first face and a second face. The solar heating block has an interior volume which includes a first compartment and a second compartment.

The first compartment is formed in part by the first face, which is disposed in use on the outside of the building. The second compartment is between the first compartment and the second face. The first compartment contains a translucent insulating material, such as an aerogel. The second compartment contains a heat-absorbing material, such as water.

In an alternative embodiment, the solar heating block has an interior volume including first, second and third compartments. The first compartment is formed in part by the first face, the second compartment is formed in part by the second face and the third compartment is between the first and second compartments. The first compartment contains a translucent insulating material, such as an aerogel. The third compartment contains a heat-absorbing material, such as water. The second compartment also contains a heat absorbing material, such as water, where the solar heating block is intended for use in a solar heating panel on a side of a building exposed to the rays of the sun in the winter, specifically, the south side of a building in the northern hemisphere or the north side of a building in the southern hemisphere. On the other hand, the second compartment also contains a translucent insulating material, such as an aerogel, where the solar heating block is intended for use in a solar heating panel on the east or west side of a building.

In a variation of this alternative embodiment, a block intended for use in a panel substantially unexposed to direct solar radiation at any time of the year, namely, a panel on the north side of a building in the northern hemisphere or on the south side of a building in the southern hemisphere, the first and second compartments contain a translucent insulating material, such as an aerogel, while the third compartment may either be empty or filled with a translucent insulating material, such as an aerogel.

The present invention will now be described in more complete detail, with frequent reference being made to the figures identified below.

DETAILED DESCRIPTION OF THE PREFERRED EMBODIMENTS

Figure 1:
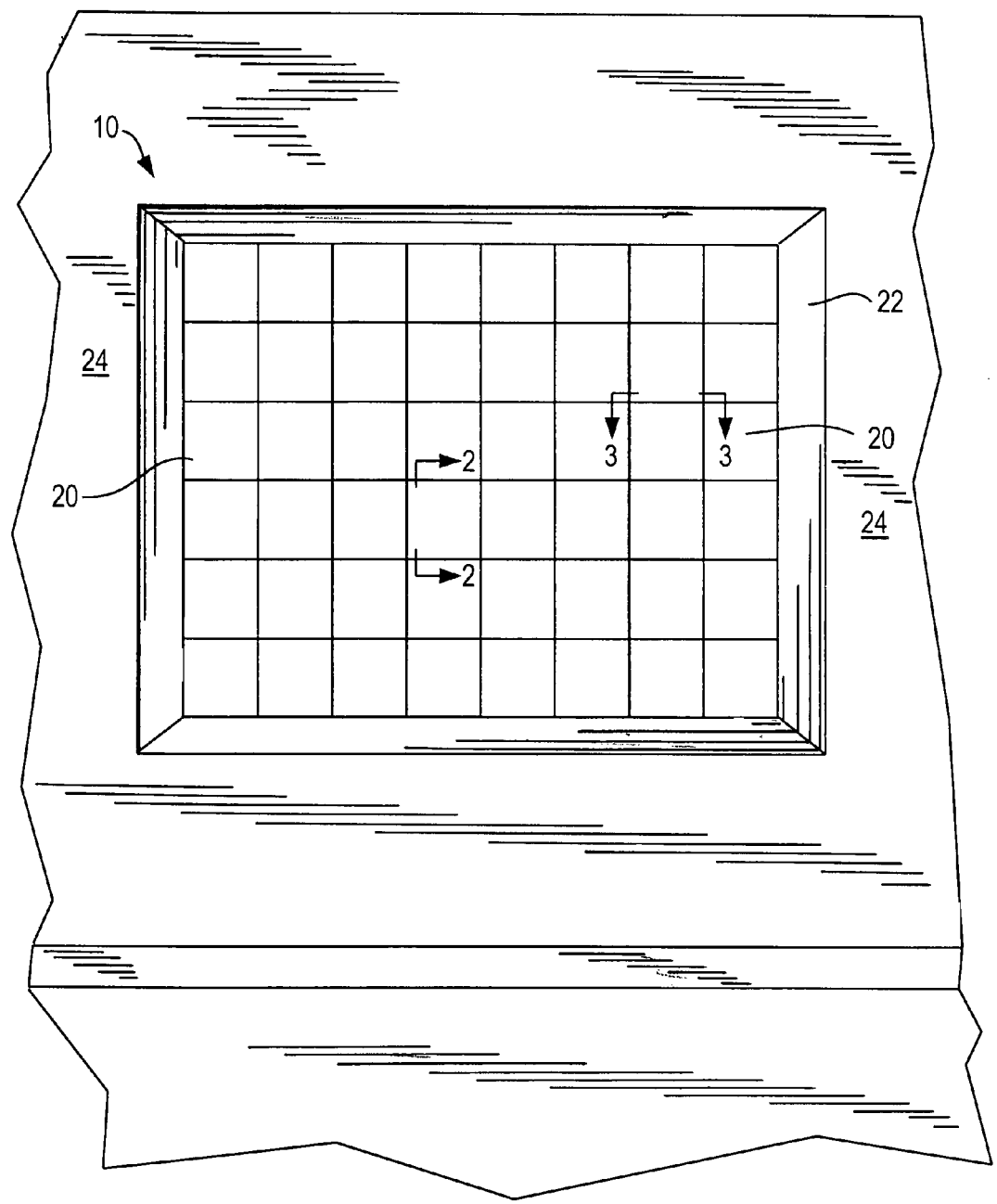
FIG. 1 is an elevational view of a solar heating panel.

Turning now to these figures, FIG. 1 is an elevational view of a solar heating panel 10 assembled from the solar heating blocks 20 of the present invention. Such a panel 10 would preferably be installed on the south side of a building (in the northern hemisphere) in order to receive maximum exposure to the winter sun, but would be at least partly shaded in the summertime by eaves or an overhang. The view shown in FIG. 1 is one of the panel 10 from inside the building, where the panel 10 takes the place of a window having southern exposure. The view from outside the building, at least in its overall appearance, would be very much the same as that presented in FIG. 1.

As will be demonstrated below, the solar heating blocks 20 interlock with one another to provide some structural integrity to the panel 10 as a whole. In addition, the panel 10 is mounted within a frame 22 to ensure a sound connection to the wall 24. While a frame is preferred, it is conceivable that the structure could be mounted into a wall without a frame.

As shown in FIG. 1, the solar heating panel 10 is an array of solar heating blocks 20 which is six blocks high and eight blocks wide. Of course, it should be understood by the reader that the present invention is not limited to arrays of these particular dimensions, and that rectangular or square arrays of other dimensions are equally possible. Moreover, with appropriate framing, arrays of other shapes could alternatively be constructed.

Figure 2:
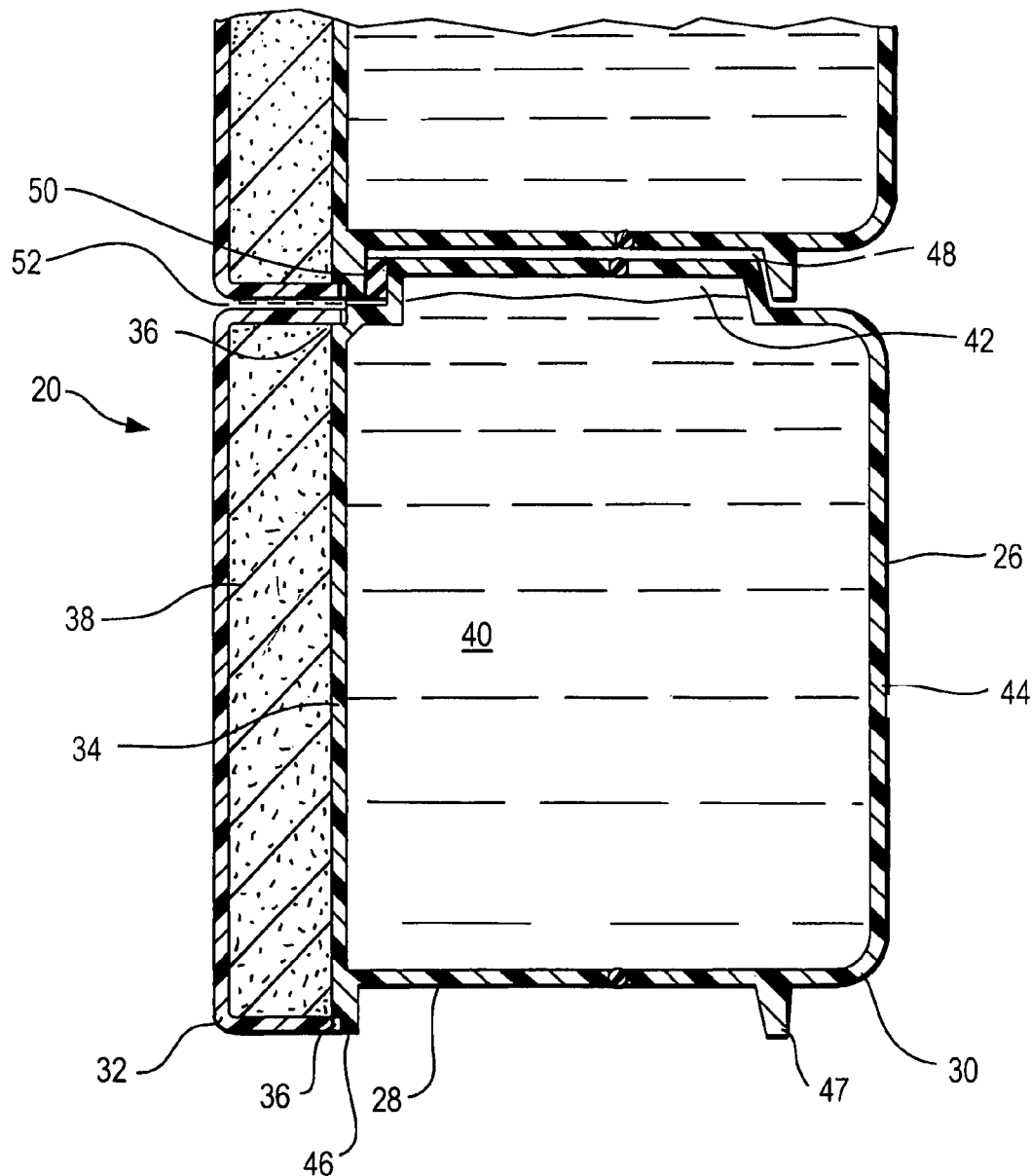
FIG. 2 is a vertical sectional view taken as indicated in FIG. 1.

FIG. 2 is a vertical section through one of the solar heating blocks 20 of panel 10, and partly showing the block 20 immediately thereabove, taken as indicated in FIG. 1. The solar heating block 20 comprises a block body 26 having a first block body half 28 and a second block body half 30. The block body halves 28, 30 are molded from clear or translucent plastic, such as an acrylic plastic, and heat-welded or sealed together to produce a watertight connection.

On the left-hand side of the block 20 in FIG. 2, that is, the side of the block 20 on the outside of the building, is a lens 32, which is also molded from clear or translucent plastic, such as an acrylic plastic or other material having high solar transmission. The lens 32, having approximately the same height and width dimensions as the block 20, is heat-welded or sealed to face 34 of the first block body half 28 at notch 36 which runs around the perimeter thereof. The lens 32 is about 1.0 inch deep, and provides a volume that thick and of the height and width dimensions of the block body 26 outwardly of face 34 for a translucent insulating material 38.

The purpose of translucent insulating material 38 is to prevent heat stored in the solar heating block 20 during the daylight hours from radiating outward during the nighttime hours. In addition, the translucent insulating material 38 allows solar radiation from outside the building to pass through the solar heating blocks 20 to provide natural illumination to the interior of the building and to heat the material within the block body halves 28, 30.

The translucent insulating material 38 of choice is aerogel, a unique form of highly porous non-hazardous silica having a lattice network of glass strands with very small pores. The solids content of aerogel is extremely low (5% solid, 95% air). Aerogel is recognized to be one of the most lightweight and best insulating solids in the world. An aerogel highly suited for the practice of the present invention is available from Cabot Corporation of Billerica, Mass. under the name NANOGEL®. These aerogels are produced in a method which renders them hydrophobic with the result that they repel water which otherwise tends to degrade its component particles, which are generally in a size range from 0.5 mm to 4.0 mm.

The block body 26, itself is filled with water 40, except for a small volume 42 at the top to allow for expansion. Three inches of pure, or clear, water absorbs about an estimated 50% of the solar infrared radiation passing through the block body 26 which generally provides a water thickness in a range from 3.0 to 6.0 inches. Several means are available for increasing this percentage. For example, the water may be dyed with a variety of coloring agents used for this purpose to increase the estimated absorption to the range of 70% to 85%. Alternatively, a dispersion agent may be used to color the water white or some other hue. The water may also include antifreeze and antimicrobial agents. For example, the water may include table salt (sodium chloride) or calcium chloride, which function both as antifreeze and antimicrobial agents. In addition, distilled water may be used to minimize the mineral and microbial content of the water being used to fill the block body 26. Finally, by filling the block body 26 with hot water, or with water that has been previously been deaerated or degassed, the formation of bubbles on the inner surface of the block body 26 and the amount of air or gas in small volume 42 at the top of the block body 26 may be kept to a minimum.

The water 40, with or without a coloring agent, could be placed into the form of a gel through the addition of a small amount of a gelling agent, such as methylcellulose. The benefits of the gelling agent are that it prevents a spill should the block body 26 crack or break, and it inhibits convective flow within the block body 26. The latter would permit heat to be transmitted more quickly from the water into the building. Water 40 having the gelling agent added tends to hold on to stored heat for a longer period of time. A minimal amount of gelling agent is all that is required; too much tends to turn the water 40 into an opaque mass.

Alternatively, so-called phase-change materials could be used in place of water. Such materials take advantage of the heat absorbed or released by a material when changing from one state to another, such as from a solid to a liquid (melting) or vice versa (freezing) at constant temperature, and enable a greater amount of heat to be stored in the solar heating block 20 when the phase-change material is heated through a temperature range which includes the temperature at which the phase-change occurs. Polyethylene glycol, as disclosed in U.S. Pat. No. 4,532,917 to Taff et al. noted above, is a phase-change material that may be used for this purpose. Many others are known to those of ordinary skill in the art.

As noted above, the block body 26 generally provides a water thickness in a range from 3.0 to 6.0 inches. The block body 26 itself may be generally square, perhaps 8.0 to 12.0 inches on a side, although it need not be perfectly square. On a practical level, however, the fact that the block 20 may become overly heavy and unwieldy if made too large, as well as generating a large hydrostatic pressure which could more easily result in a leak, makes sizes at the smaller end of the stated range more preferable.

The inner face 44 of the block body 26 may be clear, frosted or patterned, as desired, to provide a suitable interior finish. Further, in the view provided in FIG. 2, the top and bottom of the preferred block body 26 include means by which the solar heating blocks 20 may be stacked upon one another. Specifically, the bottom of the block body 26 has feet 46, 47, while the top has a narrowed portion 48 creating volume 42 provided for expansion, foot 46 being a continuation of face 34. Feet 46, 47, which run the width of the block body 26, straddle the narrowed portion 48 and thereby provide a stable stacking arrangement. Weather strip 50 runs between the outer foot 46 of the block body 26 above and the narrowed portion 48 for the width of the block body 26 and down one of its two sides—weather strip 50 on its neighbors providing for the bottom and the other of the two sides. Gap 52 between solar heating blocks 20 on the exterior of the building may be as little as 1/32 inch (0.03125 inch).

Figure 3:
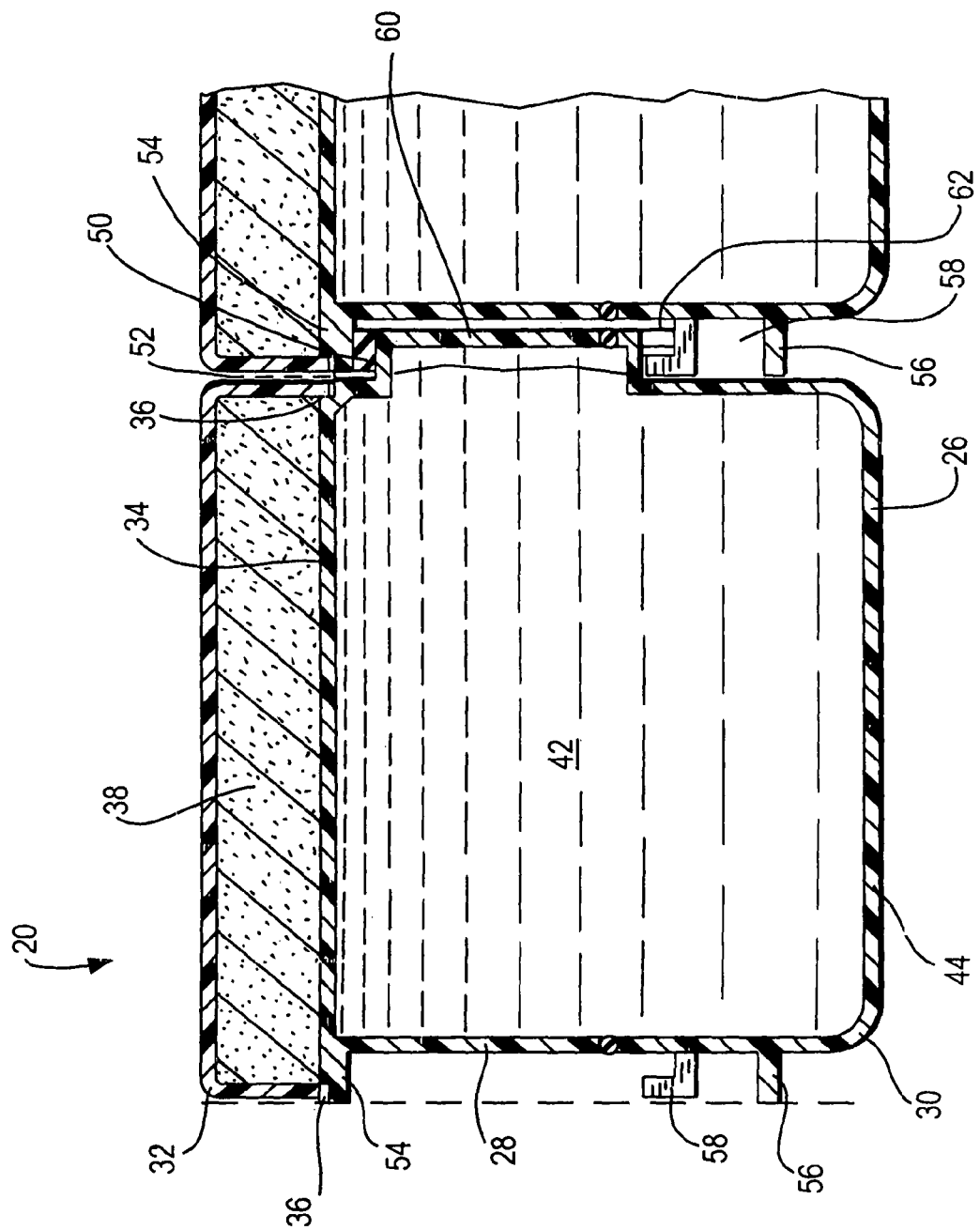
FIG. 3 is horizontal sectional view taken as indicated in FIG. 1.

FIG. 3 is a horizontal section through another of the solar heating blocks 20 of panel 10, and partly showing the block 20 immediately to its right, taken as indicated in FIG. 1. Much of the detail shown in FIG. 3 has been described above, and the previously used drawing reference numerals have been inserted where appropriate.

As the top and bottom of the block body 26 includes means by which the solar heating blocks 20 may be stacked upon one another, so also the left and right sides of the block body 26, as viewed in FIG. 3, include means by which the solar heating blocks 20 may be connected to their neighbors on the left and right. Referring first to the left-hand side of block body 26 in FIG. 3, struts 54, 56 extend from the left side of the block body 26, strut 54 being a continuation of face 34, and abut against the right side of a block body 26 to its left. Between struts 54, 56, which run for the full height of the block bodies 26, are interlock legs 58. As will be seen below, interlock legs 58, of which there are two, one above the other, on the left-hand side of the block body 26, do not extend for the full height thereof, and do not extend as far laterally from the left-hand side of the block body 26 as the struts 54, 56.

On the right-hand side of the block body 26 is a narrowed portion 60 which fits between strut 54 and interlock legs 58 of the block body 26 to its right. Narrowed portion 60 includes wedges 62, of which there are two, as will be seen below. Wedges 62, which also do not run for the full height of the block body 26, mate with interlock legs 58 to hold the block bodies 26 together. Weather strip 50 runs down one side of block body 26 between strut 54 and narrowed portion 60.

Figure 4:
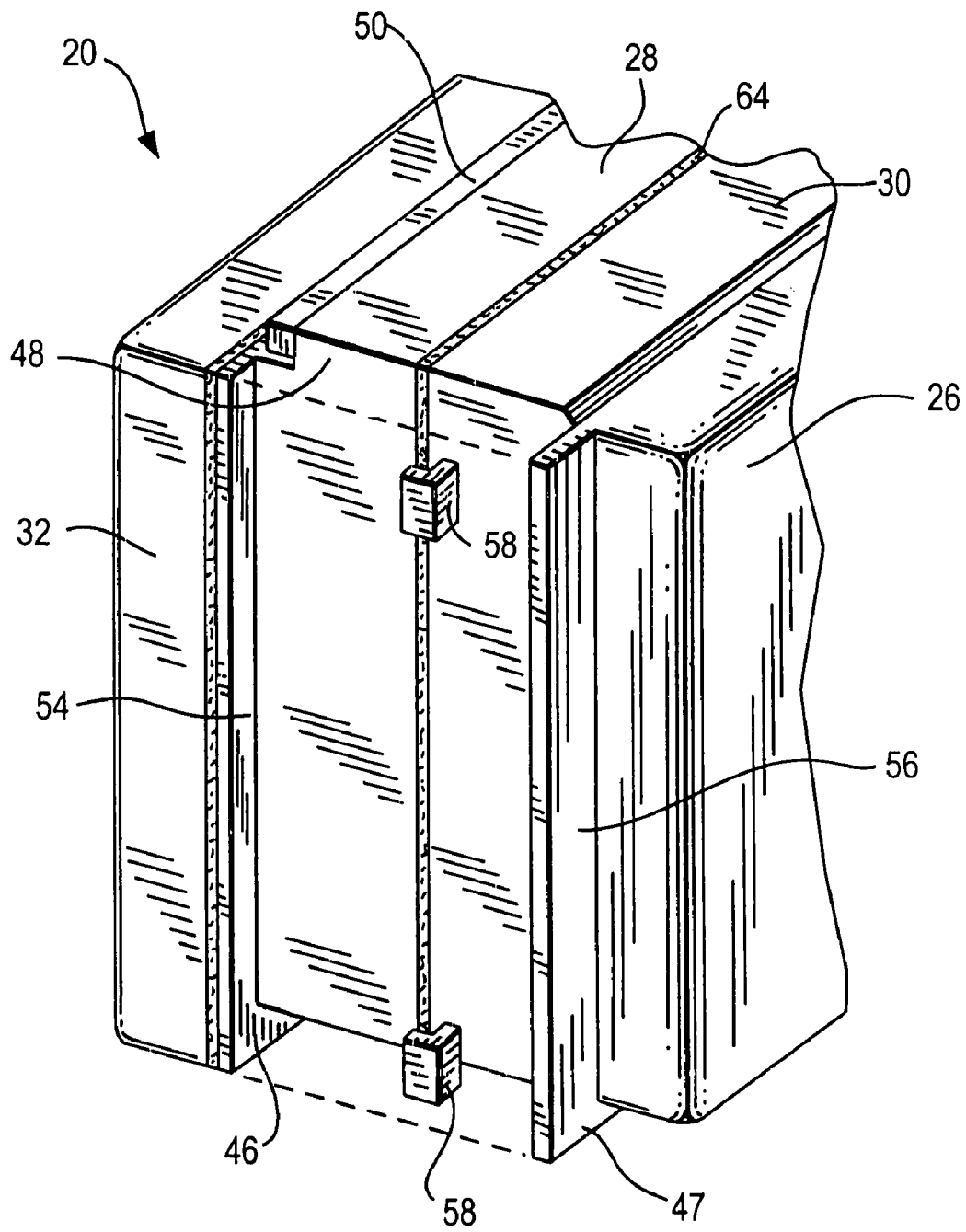
FIG. 4 is a perspective view of the left side of the solar heating block included in the panel of FIG. 1.

FIG. 4 is a perspective view of the left side of the solar heating block 20. First block body half 28 and second block body half 30 are heat-welded or sealed together along joint 64 to produce a watertight connection. Weather strip 50 runs along the top of block body 26 along narrowed portion 48. Struts 54, 56 extend from the left side of the block body 26, and continue around the bottom where they become feet 46, 47. The surfaces of foot 46 and strut 54 ultimately abut against the weather strips 50 on adjacent solar heating blocks 20 below and to the left of that illustrated.

Interlock legs 58 extend outwardly one above the other from the left side of the block body 26. The lower of the two interlock legs 58 extends downward like feet 46, 47 to fit between the gap between two solar heating blocks 20 disposed below, specifically between the narrowed portions 48 thereof to line the blocks 20 up in a vertical direction.

Figure 5:
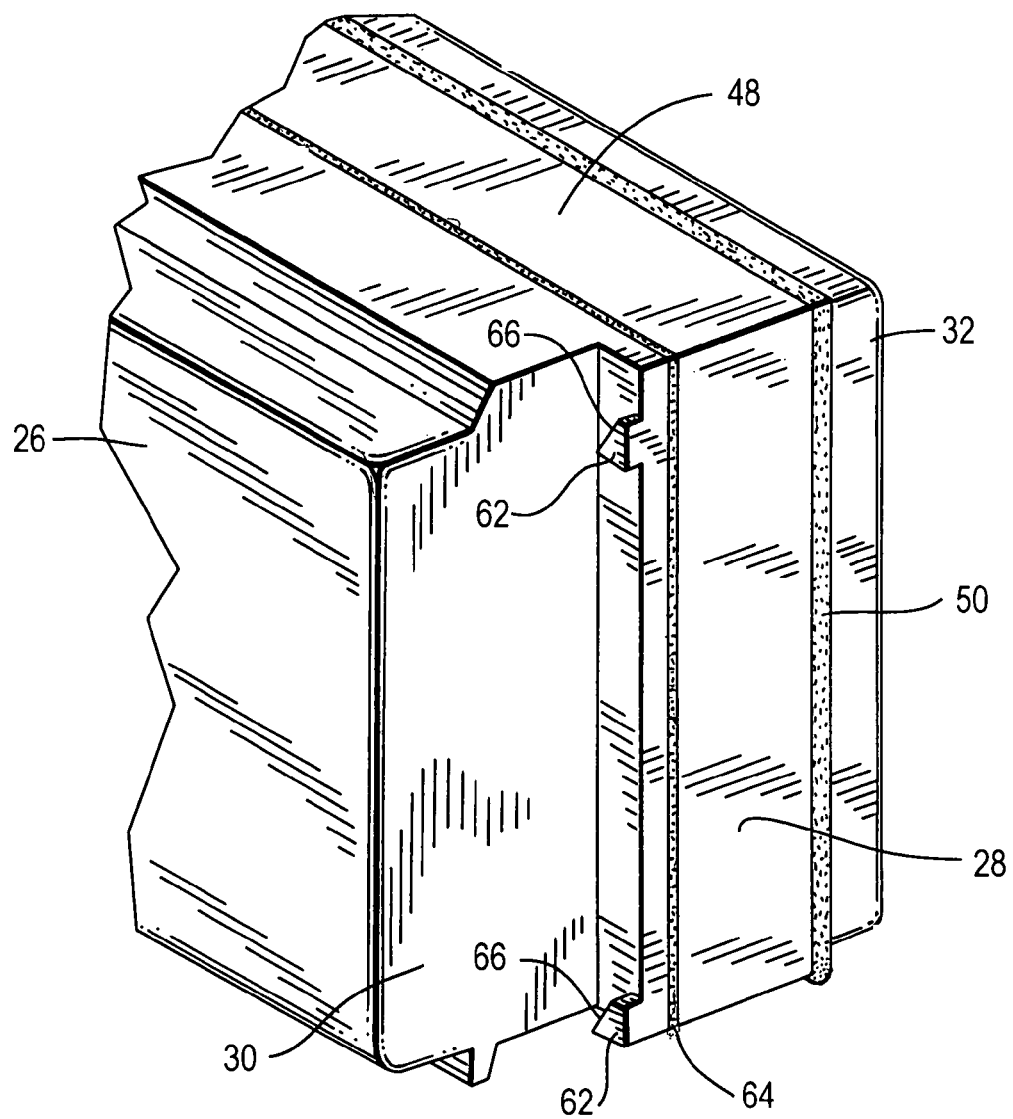
FIG. 5 is a perspective view of the right side of the solar heating block.

FIG. 5 is a perspective view of the right side of the solar heating block 20. Weather strip 50 runs, as stated above, along narrowed portion 48 on the top of block body 26, and down narrowed portion 60 on the right side of block body 26. Wedges 62 having inclined surfaces 66 oriented inwardly toward block body 26 mate with interlock legs 58 of a neighboring solar heating block 20. As such a block 20 is so mated, inclined surfaces 66 bring the two blocks 20 into a tight side-by-side relationship.

Figure 6:
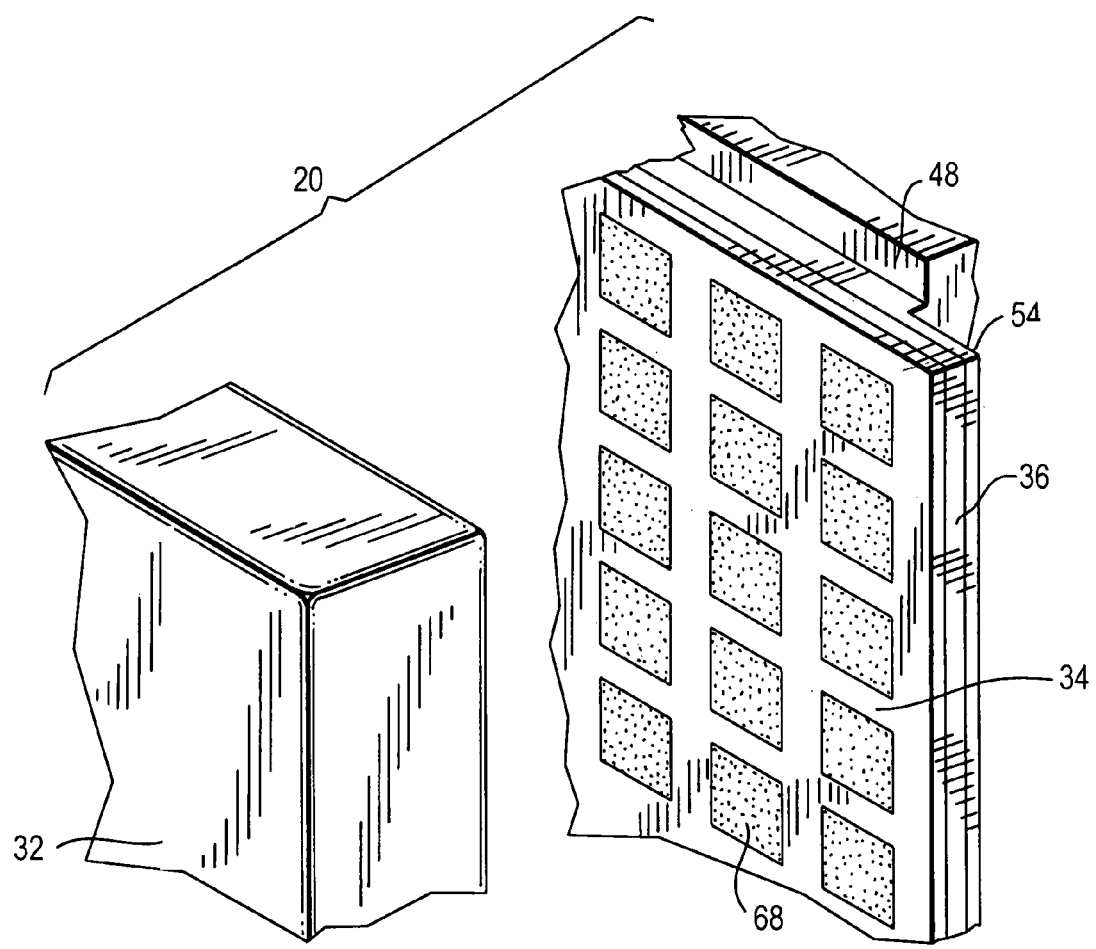
FIG. 6 is an exploded view of the left side of the solar heating block.

FIG. 6 is an exploded view of the exterior of the left side of the solar heating block 20 as shown in FIG. 4. Lens 32 is shown as being separated from face 34 of block body 26, where it is ordinarily heat-welded or sealed to notch 36. In order to increase the amount of thermal energy being absorbed by the contents of the block body 26, as an alternative or in addition to dyeing the water or using a phase-change material, the face 34 may be provided with dots or squares 68, which may cover 50% to 80% of the area of face 34.

The squares 68 or, alternatively, dots or figures of some other shape, are arranged in an array on face 34, as shown in FIG. 6. The squares 68 are first applied using white or another light-colored paint. Subsequently, the white squares 68 are covered in flat black paint or paint of some other absorbing color. With the face 34 patterned in this manner, the black surface of the squares 68 on the outside of the face 34 absorbs more heat energy and allows it to be conducted inwardly to warm the contents of the block body 26. The white or light inside surface of the squares 68 reflects heat from within the block body 26 back therein to reduce heat loss. Between the squares 68, the face 34 is clear or translucent so that some light is able to pass through and provide natural illumination within the building.

Figure 7:
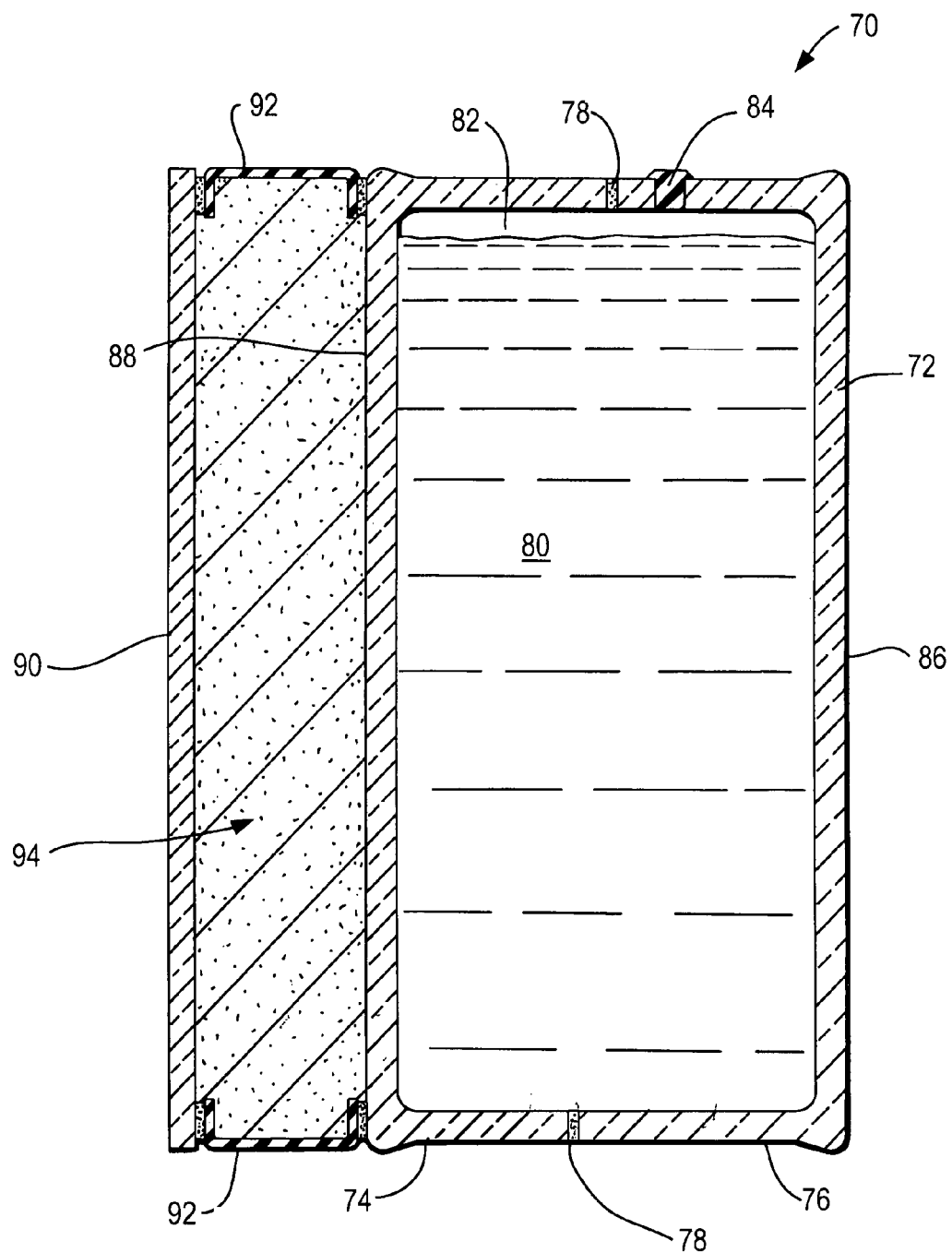
FIG. 7 is a vertical cross-sectional view of an alternative embodiment of the solar heating block.

In an alternative embodiment of the solar heating block of the present invention, shown in a cross-sectional view in FIG. 7, solar heating block 70 has a block body 72 in the form of a glass block. Glass blocks of this type are available in 8"×8"× 4" and 12"×12"×4" sizes, although a 6.0-inch thickness would be more desirable in the present context.

The block body 72 includes a first block body half 74 and a second block body half 76 which are produced separately and joined to one another at seam 78. At the top, a hole is drilled for use in filling the block body 72 with water 80, or other heat-absorbing material, leaving an air space 82 at the top for expansion. A stopper 84 or sealant is then used to close the hole once the block body 72 is filled.

The inside face 86 of the block body 72 may preferably be frosted or otherwise light-diffusing, while the outside face 88 may be patterned with an array of squares or other shapes, as described above, to maximize heat absorption. An outer pane 90 of low-iron glass, preferably having a thickness of 0.125 inches, is attached to the outside face 88 using a plastic separator extrusion 92 to minimize heat loss outward from the glass block body 72, and to create a volume, preferably having a thickness of 1.0 inches, for a translucent insulating material 94, such as an aerogel material, as described above. The plastic separator extrusion 92 is sealed to the block body 72 and outer pane 90. The 1.0-inch thickness of aerogel provides an R-value of 8.0, offering a high resistance to heat flow from within the block body 72.

The glass block body 72 and pane 90 represent an attempt to make a more durable solar heating block 70 than that previously described. However, the glass solar heating block 70 may have to be deployed differently than is currently the case, because mortar used to cement the blocks 70 to one another may provide a path, also known as a "thermal short", for heat to escape outwardly from within the block 70. In order to avoid such an outcome, individual solar heating blocks 70 may have to be separated from one another by plastic strips, and grouting or mortar may have to be used only where it is not able to conduct heat from the block body 72 to the exterior of the building.

Figure 8:
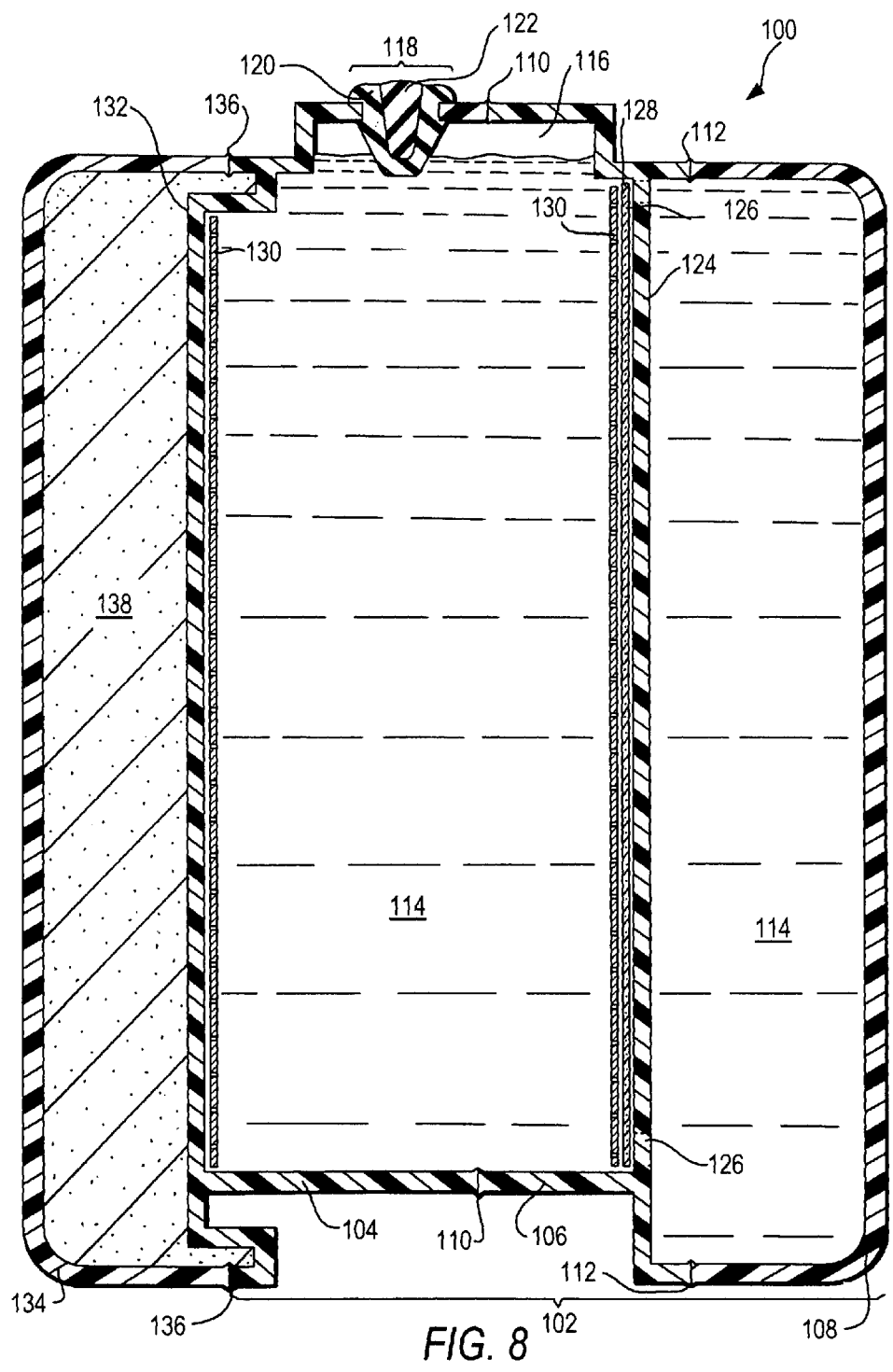
FIG. 8 is a vertical cross-sectional view of still another alternative embodiment of the solar heating block.

In still another alternative embodiment of the solar heating block of the present invention, shown in a cross-sectional view in FIG. 8, solar heating block 100 has a block body 102 which includes three sections, namely, a first interior block body half 104, a second interior block body half 106, and an inner lens 108, the latter being so-called because it is inside a building when solar heating block 100 is in use as intended. The first interior block body half 104 and the second interior block body half 106 are bonded to one another along joint 110, and the inner lens 108 is bonded to the second interior block body half 106 along joint 112.

The first interior block body half 104, the second interior block body half 106, and the inner lens 108 are molded from clear or translucent plastic, such as an acrylic plastic, and heat-welded or sealed along joints 110, 112 to produce watertight connections. Water 114, or other heat absorbing material, fills the interior of the block body 102, that is say, filling the volume between the first interior block body half 104 and the second interior block body half 106, except for an air space 116 at the top allowing for expansion, as well as the volume between the second interior block body half 106 and the inner lens 108. The water 114, or other heat-absorbing material, is introduced through hole 118, which is subsequently closed with a plug 120 and a wedge 122, which lastly is inserted into the center of plug 20 and forced thereinto to ensure that the plug 120 makes an airtight seal in hole 118.

It will be observed that the block body 102 has an internal wall 124, which is physically part of the second interior block body half 106 and which separates the two compartments formed by the first interior block body half 104 and the second interior block body half 106 and by the second interior block body half 106 and the inner lens 108. Internal wall 124 includes holes 126 so that water 114, or other heat-absorbing material, will pass into the compartment between the second interior block body half 106 and the inner lens 108 when introduced through hole 118 and will completely fill that compartment, leaving no air trapped therewithin.

Internal wall 124 is preferably frosted, ensuring that it is translucent rather than transparent, for reasons to be explained more fully below. Alternatively, a diffuser plate 128 of frosted glass or plastic, may disposed adjacent to internal wall 124 within the compartment formed between the first interior block body half 104 and the second interior block body half 106 for the same purpose. As above, inner lens 108 may be clear, frosted or patterned, as desired, to provide a suitable interior finish.

A heat-absorbing grid 130 is disposed adjacent to outer wall 132 of first interior block body half 104 and within the water-filled compartment formed between the first interior block body half 104 and the second interior block body half 106. Alternatively, and preferably, the heat-absorbing grid 130 is disposed adjacent to, or is physically joined to or is combined with, diffuser plate 128. Heat-absorbing grid 130 has the same purpose as squares 68 described above, that is, it increases the amount of thermal energy being absorbed by the contents of the block body 102. In the present embodiment, the heat-absorbing grid 130 is a perforated plate which is black on one side and white, or some other light color, on the other side. The perforations take up from 20% to 50% of the area of the heat-absorbing grid 130 so that the area not represented by the perforations is from 50% to 80% of the total area thereof. As before, the heat-absorbing grid is oriented so that the black side faces outwardly toward the exterior of the building when solar heating block 100 is in use, while the white or light side faces inwardly toward the interior of the building.

On the left-hand side of the solar heating block 100 in FIG. 8, which will be the side of the block 100 on the outside of the building is an outer lens 134, which is also molded from clear or translucent plastic, such as an acrylic plastic or other material having high solar transmission. The outer lens 134 is heat-welded or sealed to first interior block body half 104 at joint 136. Translucent insulating material 138 is disposed in the volume between the outer lens 134 and outer wall 132 of first interior block body half 104. Preferably, the translucent insulating material 138 is an aerogel material, as described above.

Figure 9:
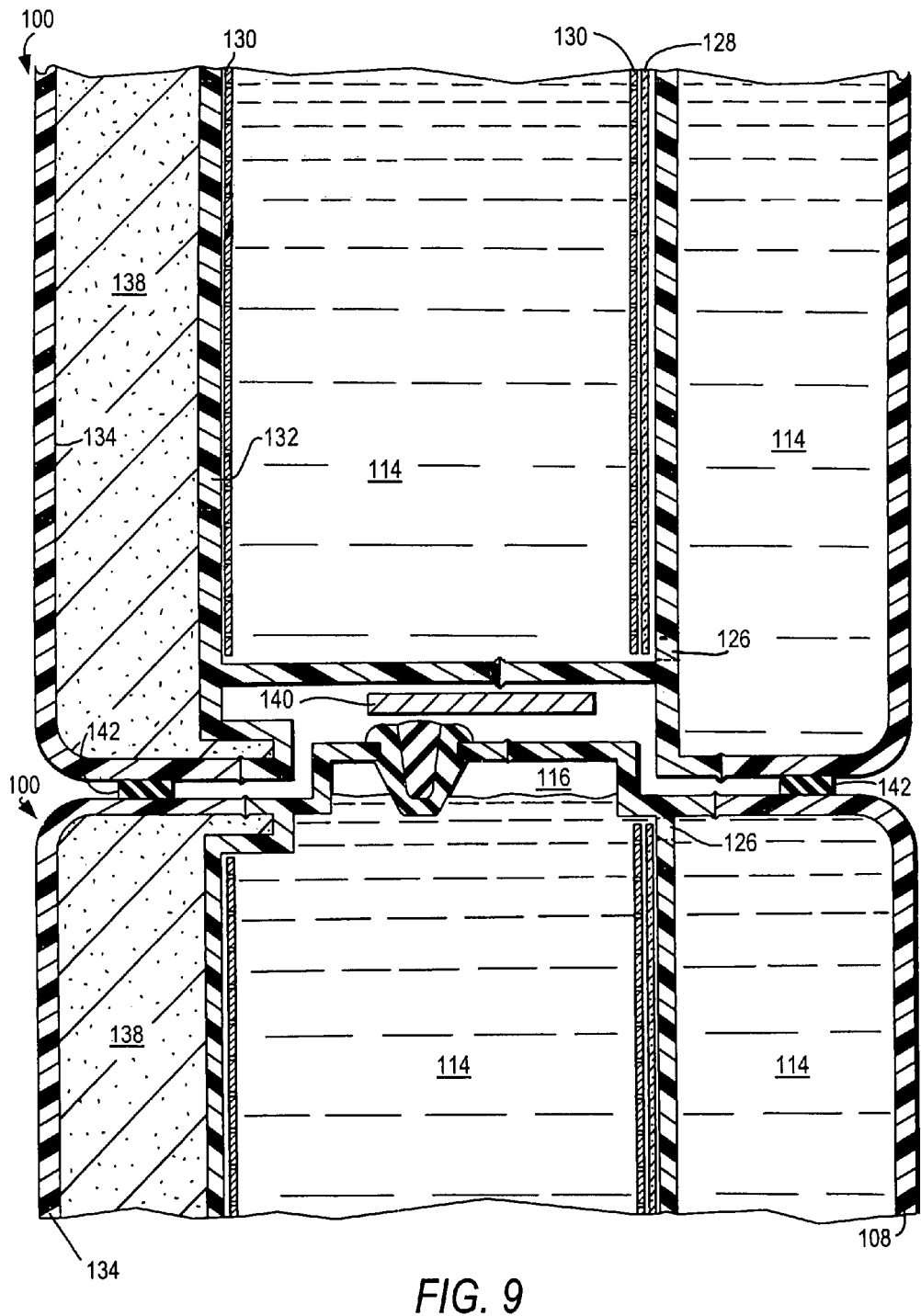
FIG. 9 is a vertical cross-sectional view taken through two vertically stacked solar heating blocks of FIG. 8.

FIG. 9 is a cross-sectional view taken through two vertically stacked solar heating blocks 100, as they would be used in a solar heating panel 10. Between the vertically stacked solar heating blocks 100 is a bar 140, preferably of steel, which runs from one side of frame 22 to the other to provide the solar heating panel with additional strength and stability. Bar 140 may have cross-sectional dimensions of 0.125 inch by 1.5 inch. However, as will be realized by one of ordinary skill in the art, bars 140 would tend to be apparent to an observer viewing the solar heating panel from within a building as dark lines running horizontally across the solar heating panel 10. This effect is minimized or completely eliminated by the diffuser plates 128 in the vertically stacked solar heating blocks 100. The diffuser plates 128 scatter light passing through the solar heating blocks 100 from left to right in FIG. 9, that is, from outside to inside the building, in all directions. In this manner, light is scattered around the opaque bar 140 making the presence of the bar 140 less apparent to an observer in the building. It should also be noted that air space 116 is hidden from the view of an observer on either side of the stacked solar heating blocks 100.

Gaskets 142 separate the outer lenses 134 and the inner lenses 108 of adjacent solar heating blocks 100 to prevent thermal shorts and to eliminate drafts which would compromise the functioning of the solar heating panel 10 comprising solar heating blocks 100.

Figure 10:
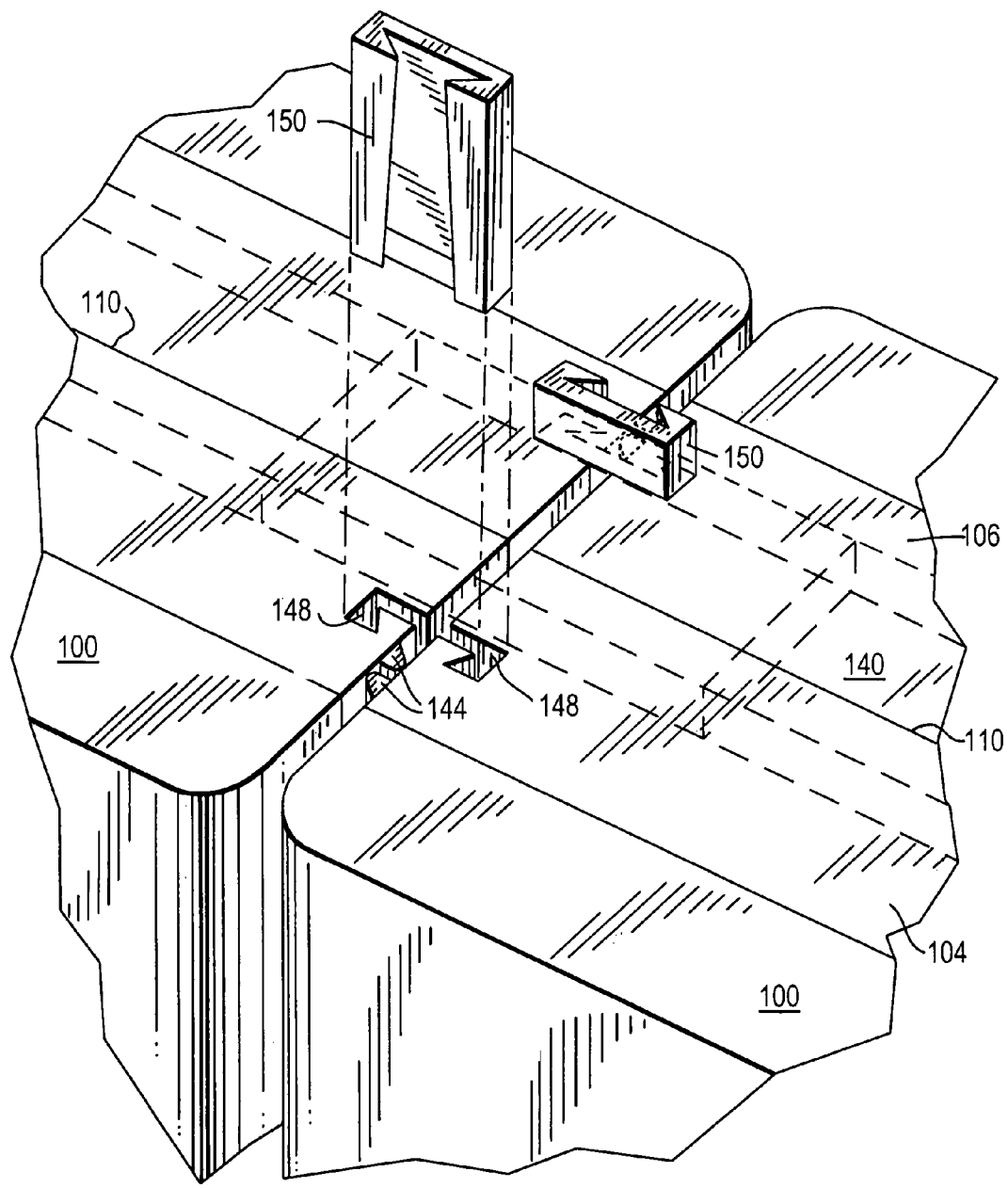
FIG. 10 is a perspective view of the top surfaces of two adjacent solar heating blocks of FIG. 8.

FIG. 10 is perspective view of the tops of two adjacent solar heating blocks 100 showing their connections to one another for additional support and stability. The sides of the first interior block body half 104 and the second interior block body half 106 have vertically oriented spacing ribs 144 to provide a slight gap 146 between laterally adjacent blocks 100. On each side of the blocks 100 is a slot 148, those on the adjacent blocks 100 lining up with one another to produce a generally U-shaped combined slot. Connector 150, adapted to fit into the combined slot and having inclined surfaces, draws the blocks 100 into a tight relationship as it is forced down into the combined slots 148. Bar 140 fits between the two connectors, 150, and the next horizontal row of solar heating blocks sit on top of the connectors 150 below.

Figure 11:
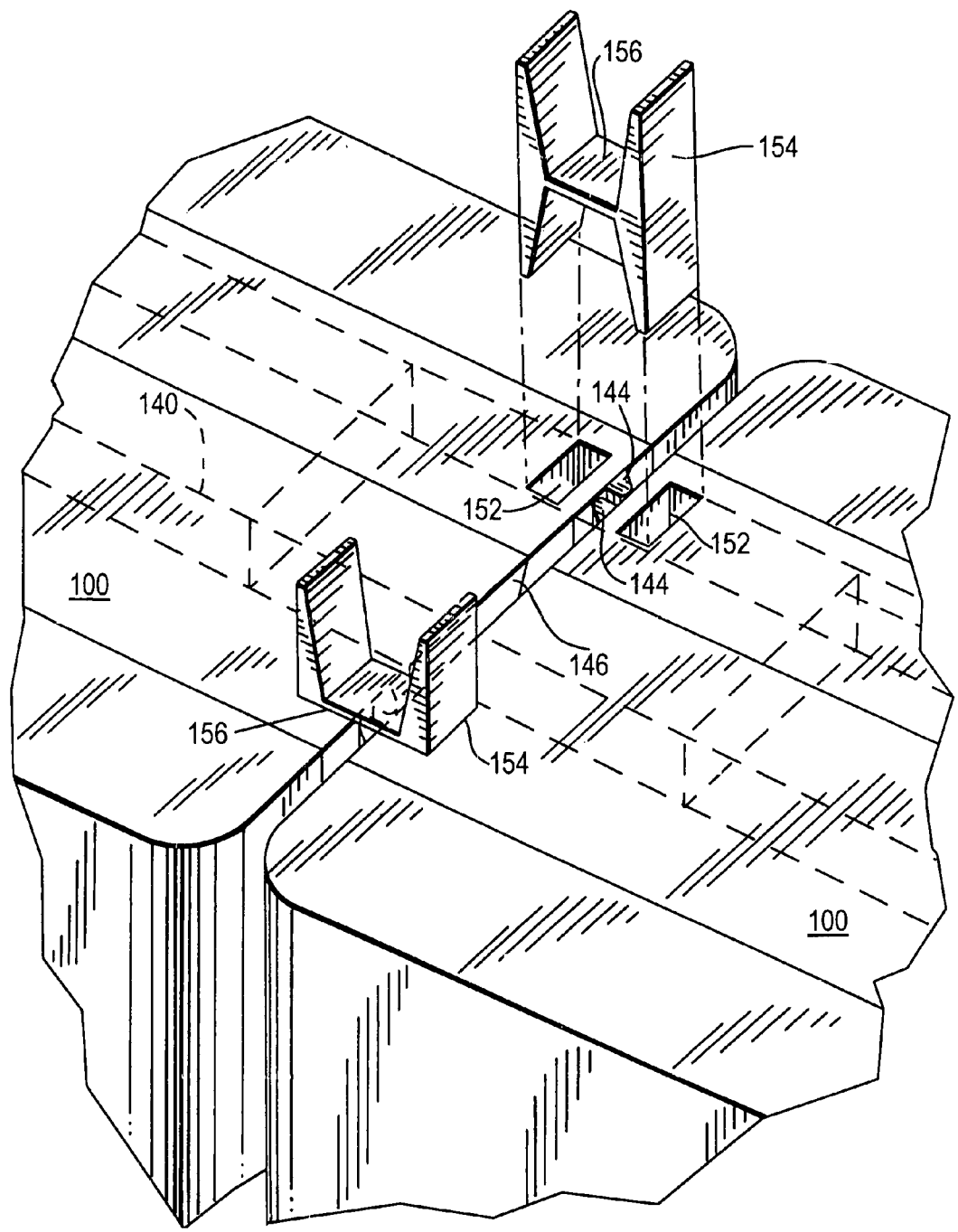
FIG. 11 is a perspective view of alternative top surfaces of two adjacent solar heating blocks of FIG. 8.

FIG. 11 is a perspective view of the tops of two adjacent solar heating blocks 100 showing an alternate approach for connecting them to one another. In this alternate approach, the connectors are generally H-shaped having vertical legs which gradually narrow from the horizontal cross member to their tops and bottoms. Again, on each side of the blocks 100 is a slot 152, those on adjacent blocks 100 lining up with one another. As show in FIG. 11, the connectors 154 have horizontal cross members 156 which maintain a desired separation between adjacent solar heating blocks, although vertically oriented spacing ribs may also be present. The legs 158 of the connectors 154 are inserted into slots 152 and draw the adjacent solar heating blocks 100 into a tight lateral relationship with one another. As above, connectors 154 straddle bar 140, and the next horizontal row of solar heating blocks 100, which have slots 152 on their undersides, sit on top of the connectors 154 below.

In general, the solar heating blocks of the present invention provide day lighting to the interior of a building in which they are used and, as such, it may be desirable to use them as east-, west- and north-facing (or south-facing in the southern hemisphere) windows as well as in the south-facing walls (in the northern hemisphere) for which they are primarily designed. Their use in east- or west-facing walls, however, will lead to overheating in summer, as they would receive the direct summer sun. However, with an array of white squares used instead of the black ones described above, most of the thermal radiation will be reflected back outside without passing through the solar heating block. This will permit the same day lighting to be achieved as in the previously described south-facing system without overheating. More sophisticated solar reflection systems may alternatively be used instead of the white squares described above.

Winter solar heat gain would not be required in east-, west- and north-facing walls. As a consequence, a less sophisticated translucent insulation material than aerogel, such as white fiberglass or fumed silica, could be used in solar heating blocks for those walls.

For example, and referring to the embodiment shown in FIG. 8, south-facing walls (or north-facing walls in the southern hemisphere) would include the solar heating block 100 as described above. For east- and west-facing walls, holes 126 would not be provided so that aerogel material could be disposed between both the outer lens 134 and the first interior block body half 104 and the second interior block body half 106 and inner lens 108. Water, or other heat-absorbing material, would then fill only the compartment between the first interior block body half 104 and the second interior block body half 106. Heat could than be stored in that interior compartment and subsequently vented to the outside of the building, perhaps with the assistance of a temperature-controlled fan to pass air through the spaces between adjacent blocks.

For north-facing walls (or south-facing walls in the southern hemisphere), the water would be omitted from the compartment between the first interior block body half 104 and the second interior block body half 106, leaving this compartment empty. Alternatively, this compartment, too, could also be filled with aerogel material.

One problem with aerogel material, however, is its tendency to settle over the course of time in response to vibrations and other movements, as aerogel tends to settle as its constituent pellets achieve ideal packing. For this reason, it is not currently used between sealed glass insulating panels, because settling would leave a large gap at the top of the panel. In the present invention, the relatively small height of the solar heating blocks reduces the scale of the settling and permits it to be hidden or otherwise addressed more simply.

Figure 12:
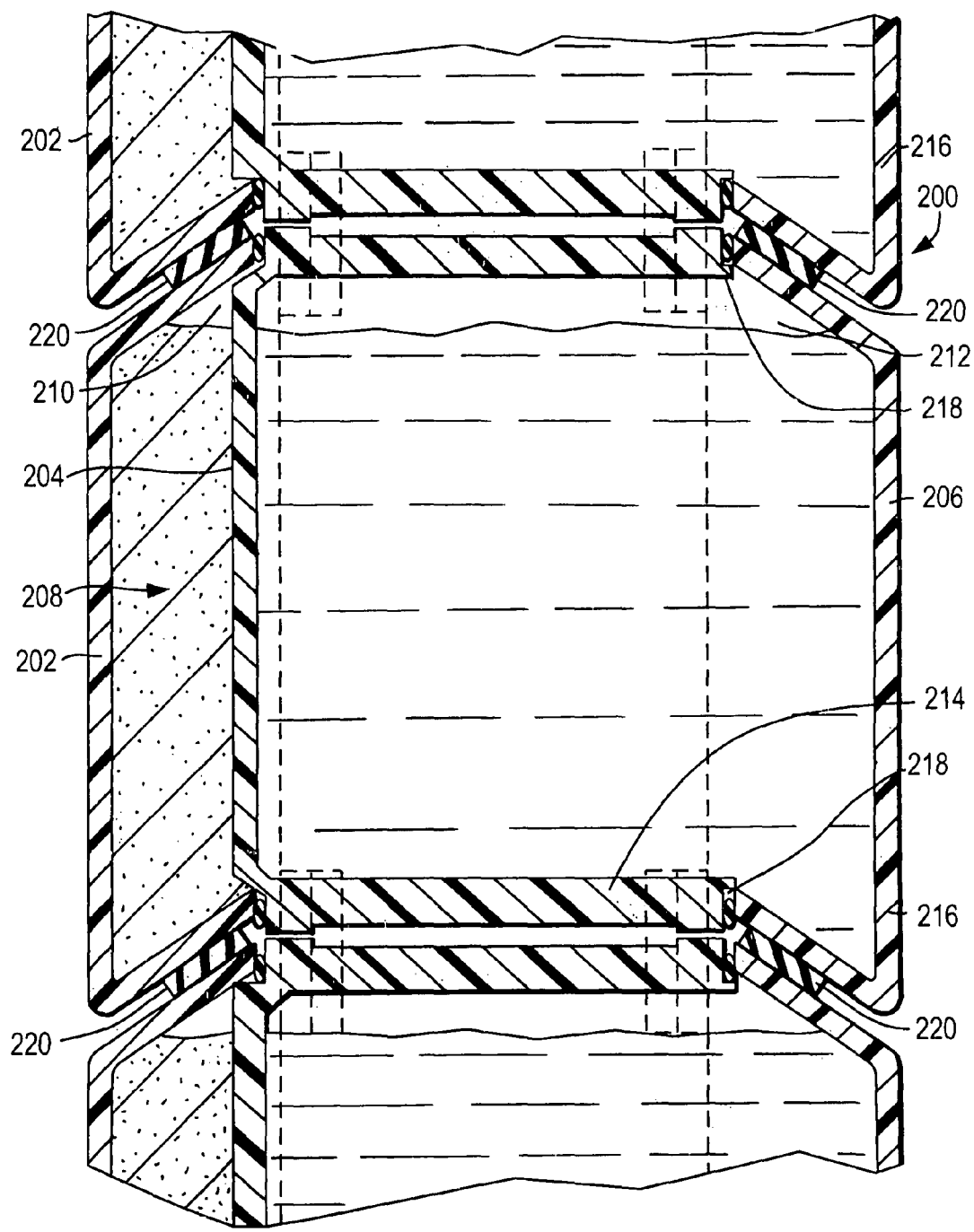
FIG. 12 is a vertical cross-sectional view through a further embodiment of the solar heating block.

Referring now to FIG. 12, a cross-sectional view through a solar heating block 200 taken in the same manner as shown in FIG. 2, specifically, taken in a vertical direction and looking toward the right side of the panel as illustrated in FIG. 1. In solar heating block 200, lens 202 is sealed to the outer face 204 of the block body 206. Translucent insulating material 208 may settle as indicated by the presence of space 210 at the top of the volume between the lens 202 and outer face 204 of block body 206. As before, the outer face 204 may be patterned with an array of heat-absorbing squares as previously described.

It will be noted that the upper and lower surfaces of lens 202 are inclined in a downward direction. As a consequence, space 210, from which translucent insulating material 208 has settled, is hidden from view by the lens 202 of the solar heating block 200 immediately above. At the same time, air space 212 at the top of block body 206 is also hidden from view.

The same approach may also be used on the inside of the solar heating block 200. Block body 206 may comprise a first block body half 214 and a second block body half 216, which may be physically identical to lens 202. First block body half 214 and second block body half 216 may be hermetically welded or sealed to one another along seal 218. Second block body half 216, like lens 202, has upper and lower surfaces which are inclined in a downward direction. As a consequence, the air space 212 is hidden from view by the second block body half 216 of the solar heating block 200 immediately above. Weather strip 220 may be used as shown between the lenses 202 and second block body halves 216 of the vertically stacked solar heating blocks 200.

Figure 13:
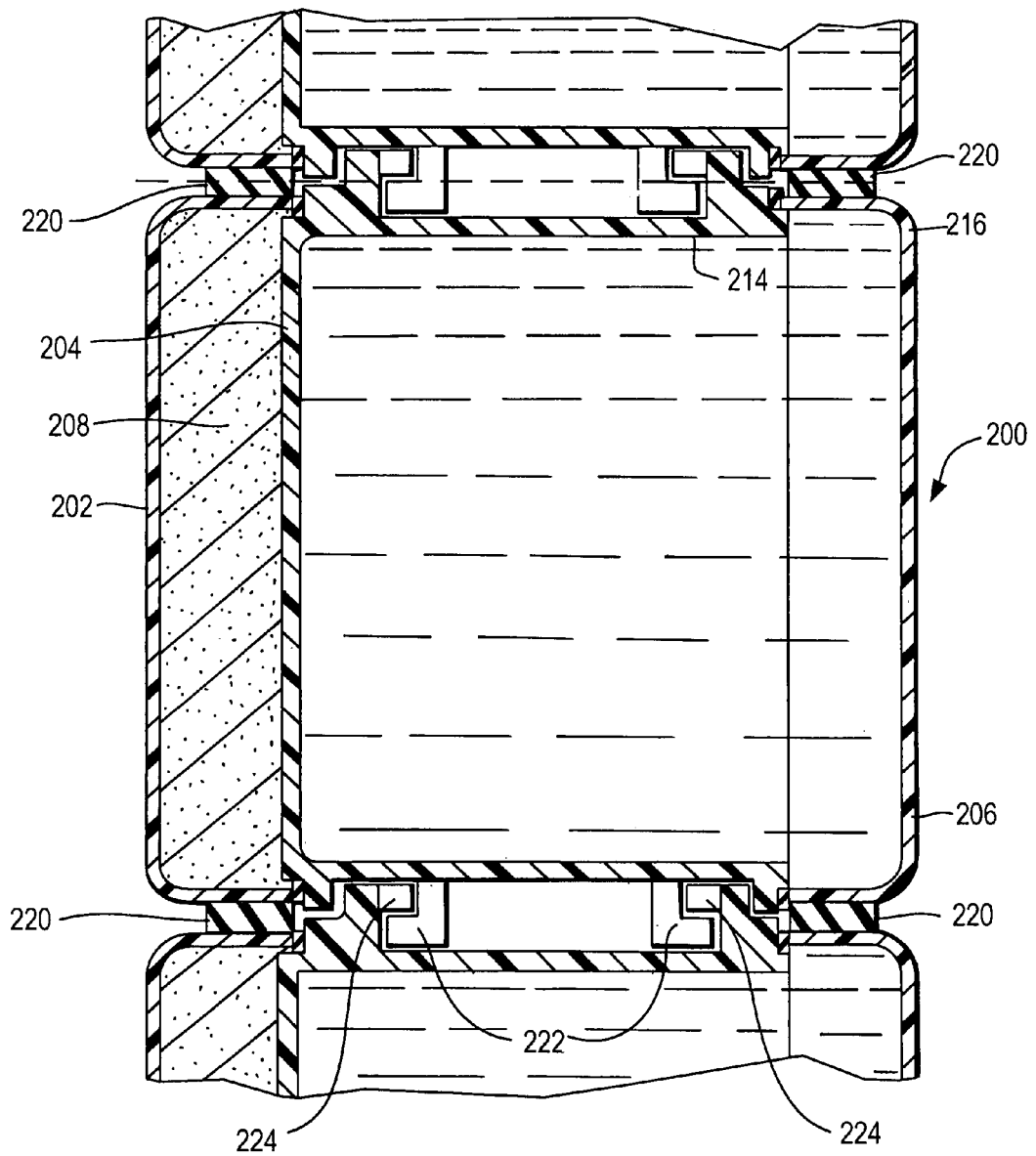
FIG. 13 is a horizontal cross-sectional view through the solar heating block shown in FIG. 12.

FIG. 13 is a cross-sectional view through solar heating block 200 taken in the same manner as shown in FIG. 3, specifically, taken in a horizontal direction and looking downward in the panel as illustrated in FIG. 1. Referring to FIG. 13, solar heating block 200 interlocks with those on its left and right in a manner similar to that shown in FIG. 3. Specifically, a pair of interlock legs 222 are on one side of block body 206 while a pair of wedges 224, similar to those previously described above, interlock with one another to hold solar heating block 200 securely to its neighbors on either side. At the bottom of the block body 206, interlock legs 222 extend downward into the space between the neighboring blocks 200 below to align the blocks 200 vertically.

Figure 14:
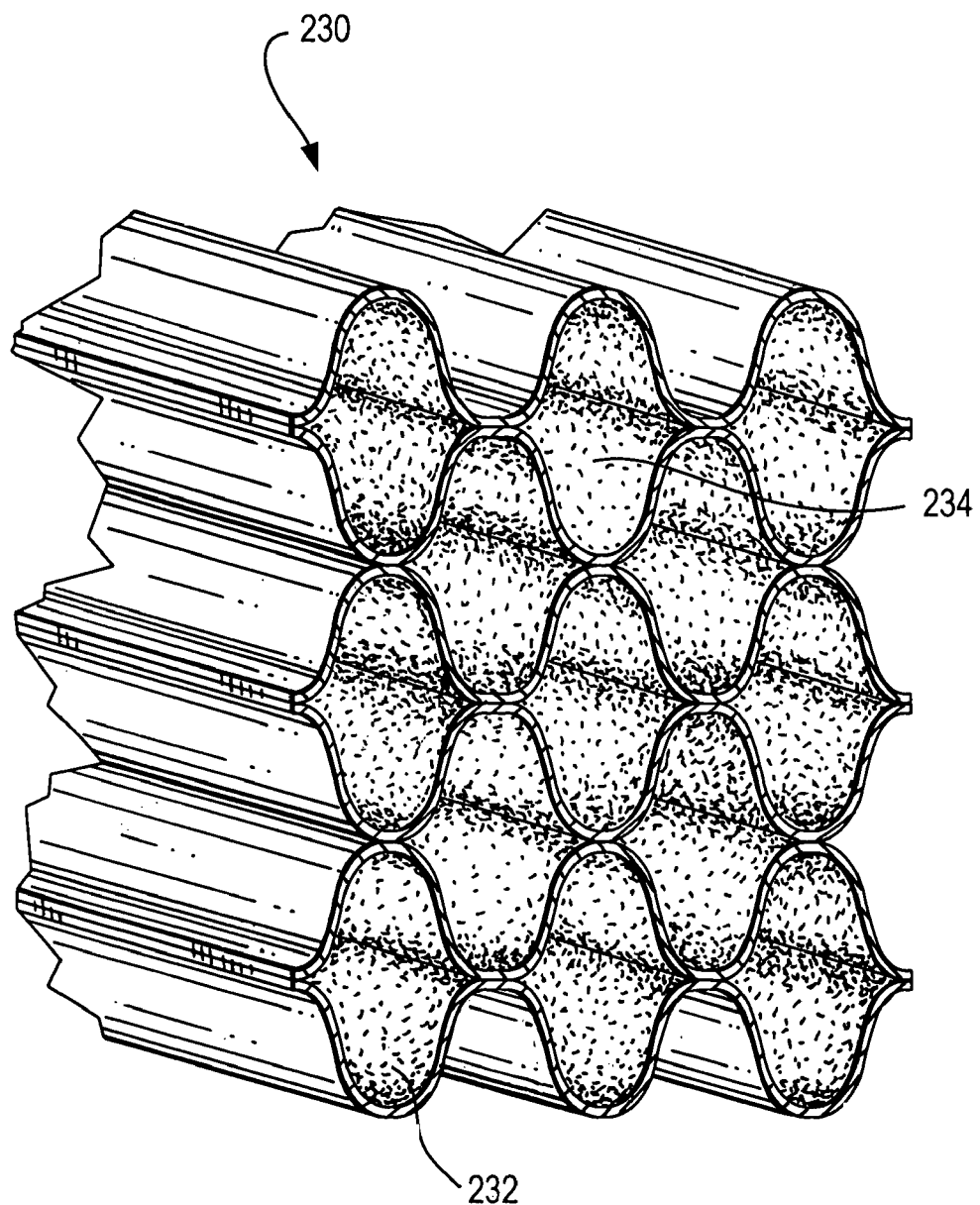
FIG. 14 is a perspective view of honeycomb material which may be used in the solar heating blocks of the present invention.

In an alternative approach, a honeycomb material 230, shown in a perspective view in FIG. 14, of appropriate dimensions may be disposed between lens 32 and face 34 of block body 26, such that the individual cells 232 are oriented in a horizontal direction. The honeycomb material 230 may, for example, be of a clear Mylar, and may be placed in lens 32 with the individual cells 232 oriented in a vertical direction. Translucent insulating material 234, such as aerogel, may then be poured into cells 232 to completely fill them. After the translucent insulating material 234 is leveled, and the block body 26 attached to the lens 32, any settling of the translucent insulating material 234 within the individual cells 232 will be far less noticeable than it would have been without the honeycomb material 230.

Figure 15:
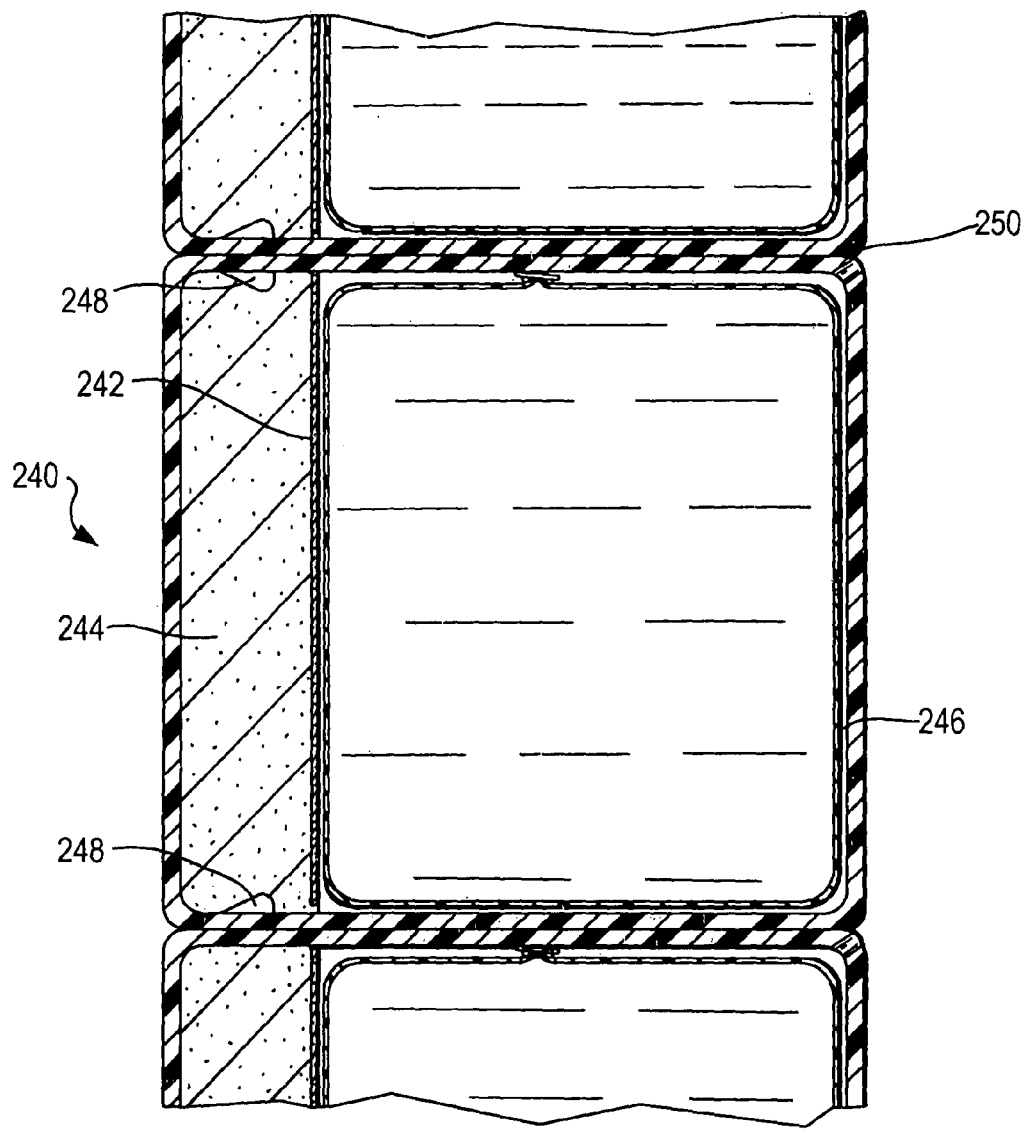
FIG. 15 is a vertical cross-sectional view of yet another embodiment of the solar heating block.

In yet another approach, shown in vertical cross section in FIG. 15, a solar heating block 240 includes an absorber plate 242 having an array of absorbing squares as described above. Between the absorber plate 242 and the outside of the solar heating block 240 is translucent insulating material 244, such as aerogel. On the inside of the absorber plate 242, the liquid contents which absorb heat are sealed within a plastic bag 246, or the like, which maintains pressure on the absorber plate 242. Any settling of the translucent insulating material 244 is rendered less apparent by the pressure on absorber plate 242 causing the translucent insulating material 244 to continue to fill the space between the absorber plate 242 and the outside of the solar heating block 240. The inside of the solar heating block 240 includes limit stops 248 which limit the extent the absorber plate 242 may move toward the outside of the block 240. The block 240 may also be open at vent 250 to allow for expansion. In addition, the absorber plate 242 may be eliminated and the absorbent array of squares printed directly on plastic bag 246 in an alternative arrangement. Solar heating block 240 may, in this embodiment, be a clear plastic (acrylic) block.

Figure 16:
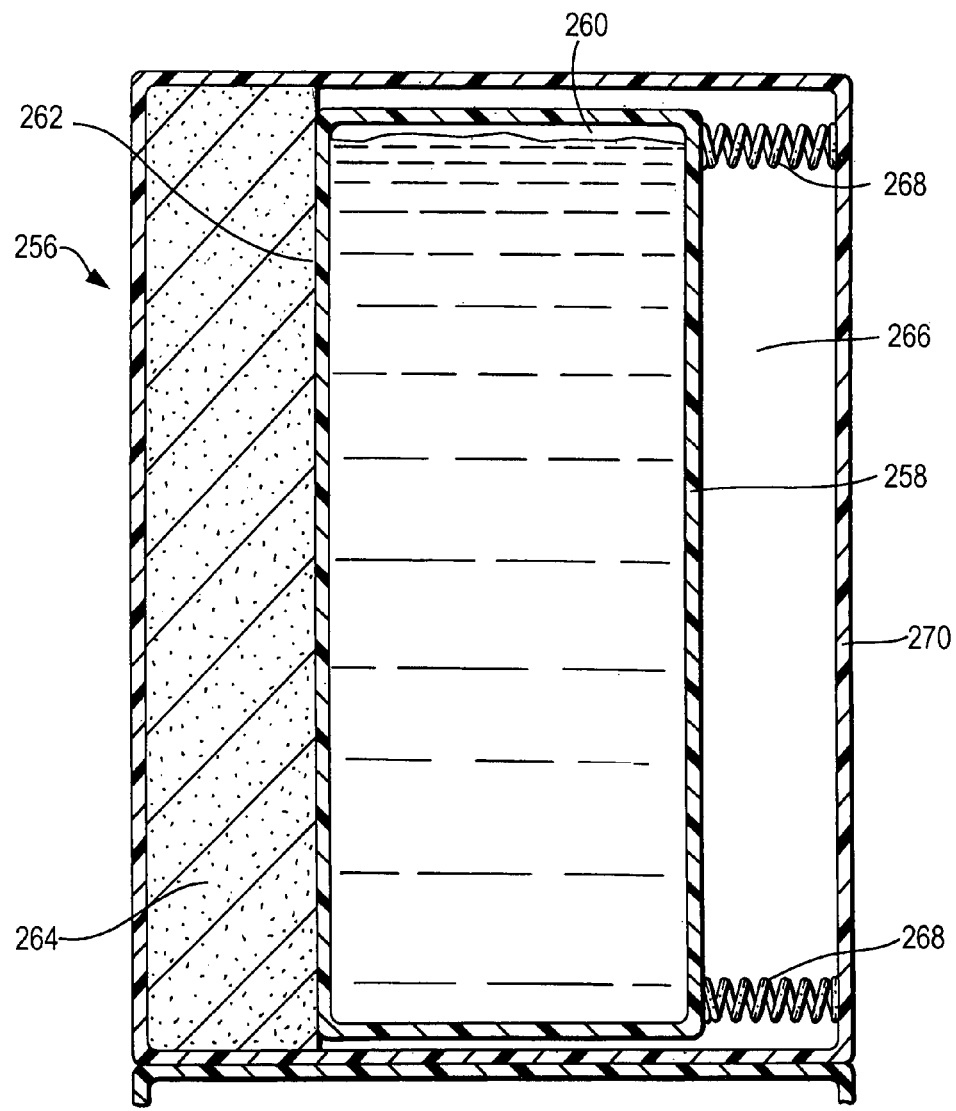
FIG. 16 is a vertical cross-sectional view of still another embodiment of the solar heating block.

In still another approach, shown in vertical cross section in FIG. 16, solar heating block 256 includes a separate, interior liquid container 258, which may be blow-molded, filled with liquid and sealed, leaving air space 260 for expansion. Outer face 262 of liquid container 258 may be provided with an array of absorbent squares, as previously described.

On the outside of the liquid container 258 is translucent insulating material 264, such as aerogel, occupying the space between the liquid container 258 and the outside of the solar heating block 256. On the other side of the liquid container 258 within the solar heating block 256 is an air space 266 which has some insulating value to slow the transfer of heat from the contents of the liquid container 258 to the interior of the building. Springs 268 bias the liquid container 258 toward the translucent insulating material 264 to negate any settling which may take place therein. The inside face 270 of the solar heating block 256 may be of a light-diffusing character, for example, frosted.

Figure 17:
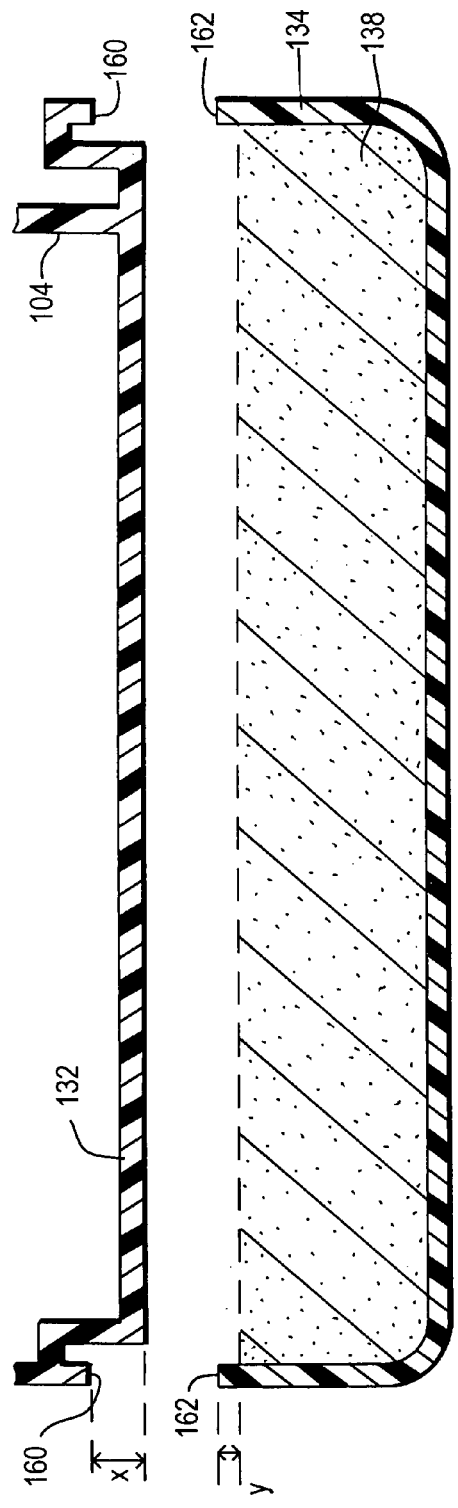
FIG. 17 is a cross-sectional view through a portion of the solar heating block of FIG. 8 prior to assembly.

Finally, the embodiment shown in FIG. 8 enables still another approach toward solving the settling problem to be taken. Referring to FIG. 17, a cross-sectional view of first interior block body half 104 and outer lens 134 before they are joined to one another, it will be noted that outer wall 132 of first interior block body half 104 protrudes beyond edges 160, which are heat-welded or sealed to edges 162 of outer lens 134 to produce joint 162 of outer lens 134 to produce joint 136. The amount of protrusion is labeled "X" in FIG. 17.

Figure 18:
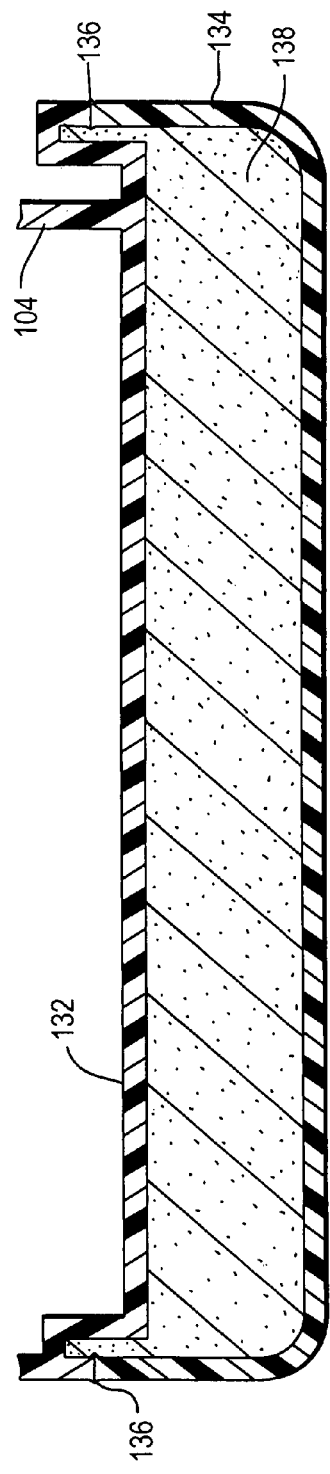
FIG. 18 is a cross-sectional view through the portion of the solar heating block shown in FIG. 17 following assembly.

Translucent insulating material 138, such as an aerogel material, is disposed in outer lens 134 to a depth an amount "Y" below edges 162. By filling the outer lens 134 to a depth such that "Y" is less than "X", the translucent insulating material 138 is compressed by outer wall 132 to some degree when the first interior block body half 104 is forced down thereonto to bring edges 160 into contact with edges 162 to permit joint 136 to be formed. The result is shown in FIG. 18, where the translucent insulating material 138 occupies the entire volume between the first interior block body half 104 and the outer lens 134.

The compression of the translucent insulating material 138 has been found to cure the settling problem by packing it into the available volume. In the compressed state each particle of the translucent insulating material 138 becomes locked into position relative to others to prevent settling from occurring. It has been found that an amount of compression, which equals "X-Y", equal to about 20% of the original uncompressed depth of the translucent insulating material 138 in the outer lens 134 solves the settling problem completely.

Returning, now, to the view presented in FIG. 1, it may be desirable to install insulating fabric tiles on the inside surfaces of the solar heating blocks 20 shown. Such fabric tiles may be useful to moderate the rate at which solar heating blocks 20 release stored heat into the room, as well as to provide an aesthetic visual appearance and to allow consumers to coordinate the appearance of the entire solar heating panel 10 with the rest of the room. A felt insulating pad, light-transmitting, and having desired thicknesses and numbers of layers, can be trapped by the fabric tile to provide varying degrees of insulation to temper the system to achieve a desired R value, such as R-1 to R-3. A higher R value on the inside, while still not approaching R-8 of aerogel material, still allows a majority of the stored heat to flow towards the room, but tempers its flow and allows the temperature of water in the blocks 20 to remain hotter and to heat the room for a longer period of time.

Figure 19:
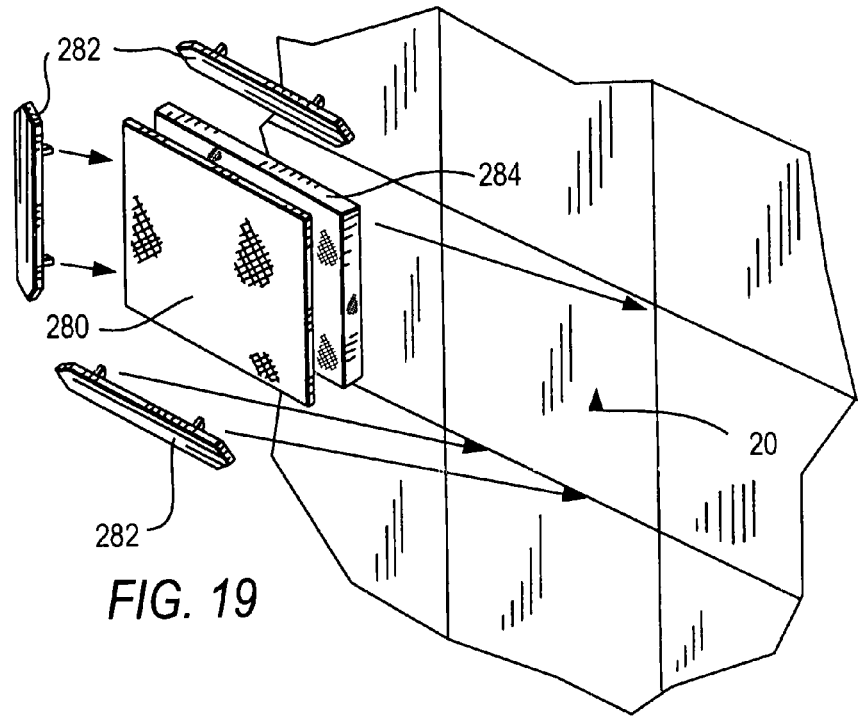
FIG. 19 is a perspective view of a portion of the solar heating panel of FIG. 1 and a fabric tile.

FIG. 19 is a perspective view of a portion of the solar heating panel 10 shown in FIG. 1 showing the installation of a fabric tile 280 on one of the solar heating blocks 20. Trim 282, which may be of wood or plastic, snaps into the gaps between adjacent solar heating blocks 20 to hold the fabric tile 280 in place. The optional translucent felt insulating pad 284, when desired, is installed behind the fabric tile 280.

Figure 20A:
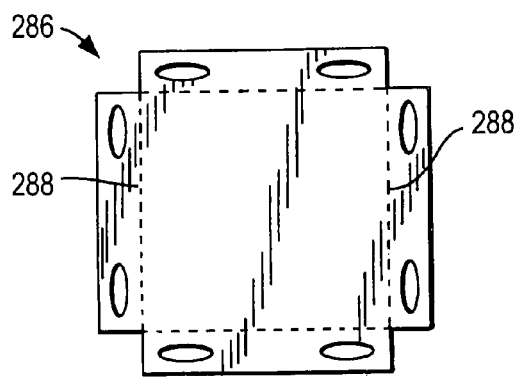
FIG. 20A is a plan view of an alternate fabric tile.
Figure 20B:
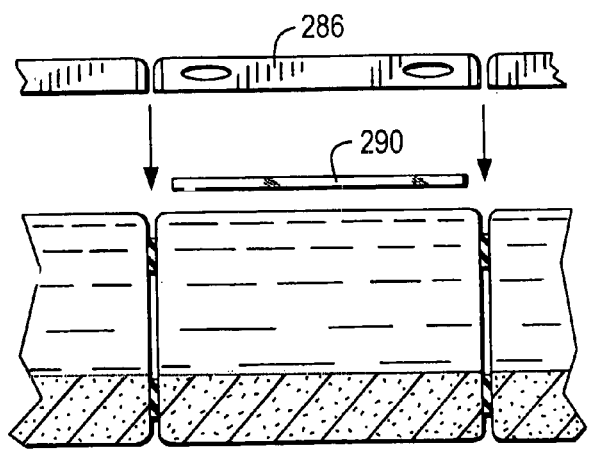
FIG. 20B is a side view of the solar heating panel of FIG. 1 showing the fabric tile of FIG. 20A.

In an alternate embodiment, shown in FIGS. 20A and 20B, fabric tile 286 has the flattened appearance shown in the plan view of FIG. 20A with creases 288. When folded along the creases 288, the fabric tile 286 is installed in the gaps between adjacent solar heating blocks 20, as shown in side view in FIG. 20B. The optional translucent felt insulating pad 290, when desired, is installed behind the fabric tile 286.

It should be appreciated that a framed window consisting of multiple blocks may use blocks having different degrees of translucency and heat absorption. These blocks could include a transparent block filled with water using an air space as insulation, a transparent or translucent block filled with water using aerogel as an insulation, and a transparent or opaque block filled with phase-change material using aerogel as insulation, or any combination thereof. This provides for privacy with some see-through and balances the energy differences between an air-insulated transparent water block and an aerogel-insulated semi-opaque phase-change block, thus creating a window system which, as a whole, is very energy efficient.

Modifications to the above would be obvious to those of ordinary skill in the art, but would not bring the invention so modified beyond the scope of the appended claims.

What is claimed is:

1. A solar heating block for covering at least a portion of a building wall opening,
    said solar heating block having an interior volume defined within:
        a top face and a bottom face which is substantially parallel thereto, wherein said block is stackable along said top and bottom faces;
        a first face, which is substantially perpendicular to said top face, for facing the exterior of the building; and
        a second face, which is substantially parallel to the first face, for facing the interior of the building;
    said interior volume including a first compartment and a second compartment,
    said first compartment being formed in part by said first face so that the first compartment is an exterior facing compartment, and said second compartment being between said first compartment and said second face so that the second compartment is an interior facing compartment, wherein:
    said first compartment is substantially filled and sealed with a translucent insulating material so as to form a lens;
    said second compartment is substantially filled and sealed with a heat-absorbing material and includes a volume for allowing for expansion of the heat-absorbing material; and
    the first face, second face, and a third face, which is between said first and second compartments and is substantially parallel to the first face, are clear or translucent.

2. A solar heating block as claimed in claim 1, wherein said translucent insulating material is aerogel.

3. A solar heating block as claimed in claim 2, wherein said aerogel is hydrophobic.

4. A solar heating block as claimed in claim 1, wherein said translucent insulating material is white fiberglass.

5. A solar heating block as claimed in claim 1, wherein said translucent insulating material is fumed silica.

6. A solar heating block as claimed in claim 1, wherein said heat-absorbing material is water.

7. A solar heating block as claimed in claim 6, wherein said water is dyed.

8. A solar heating block as claimed in claim 6, wherein said water includes a gelling agent.

9. A solar heating block as claimed in claim 8, wherein said gelling agent includes methylcellulose.

10. A solar heating block as claimed in claim 1, wherein said heat-absorbing material includes antifreeze.

11. A solar heating block as claimed in claim 1, wherein said heat-absorbing material includes antimicrobial agents.

12. A solar heating block as claimed in claim 1, wherein said heat-absorbing material includes phase-change material.

13. A solar heating block as claimed in claim 1, wherein said second face is clear.

14. A solar heating block as claimed in claim 1, wherein said second face is frosted.

15. A solar heating block as claimed in claim 1, wherein said second face is patterned.

16. A solar heating block as claimed in claim 1, wherein said second compartment has a side facing said first compartment, said side having an array of light-colored geometric figures applied thereto, said geometric figures covering a portion of the area of said side.

17. A solar heating block as claimed in claim 16, wherein said geometric figures are squares.

18. A solar heating block as claimed in claim 16, wherein said geometric figures are circles.

19. A solar heating block as claimed in claim 16, wherein said portion is at least 50% of the area of said side.

20. A solar heating block as claimed in claim 16, wherein said portion is in a range from 50% to 80% of the area of said side.

21. A solar heating block as claimed in claim 16, wherein said light-colored figures are covered with a dark-colored absorbent coating on said side facing said first compartment.

22. A solar heating block as claimed in claim 1, wherein said block is of an acrylic plastic.

23. A solar heating block as claimed in claim 1, wherein said block is of glass.

24. A solar heating block as claimed in claim 1, wherein
a top of said solar heating block has a narrowed portion, extending away from said bottom face, creating said volume for said expansion; and
a bottom of said solar heating block has a contoured portion for straddling the narrowed portion of another second solar heating when solar heating blocks are stacked upon one another, so that said narrowed portion is hidden from view of an observer on either side of the stacked blocks.

25. A solar heating block as claimed in claim 1, wherein a first side of said solar heating block has at least one interlocking leg and a second side of said solar heating block has at least one wedge, said interlocking leg mating with said wedge of another solar heating block when solar heating blocks are arranged side-by-side one another.

26. A solar heating block as claimed in claim 1, wherein said second compartment is a glass container and said first compartment comprises a side of said second compartment, a plastic separator extrusion attached to a perimeter of said side of said second compartment, and an outer glass pane attached to said plastic separator extrusion.

27. A solar heating block as claimed in claim 1, wherein said first compartment includes a honeycomb material having horizontally oriented cells, said cells being filled with translucent insulating material to reduce the effect of settling of said material.

28. A solar heating block as claimed in claim 1, wherein said second compartment is a sealed plastic bag.

29. A solar heating block as claimed in claim 28, further comprising an absorber plate separating said second compartment from said first compartment, said absorber plate being a side of said second compartment.

30. A solar heating block as claimed in claim 1, wherein said second compartment is biased toward said first compartment to reduce the effect of settling of said translucent insulating material.

31. A solar heating block as claimed in claim 1, further comprising a fabric tile on said second face thereof.

32. A solar heating block as claimed in claim 31, further comprising a translucent felt insulating pad between said fabric tile and said second face of said solar heating block.

33. A solar heating block for covering at least a portion of a building wall opening,
said solar heating block being an insulating, infrared-absorbing, light-diffusing block, said solar heating block having an interior volume defined within:
a top face and a bottom face which is substantially parallel thereto, wherein said block is stackable along said top and bottom faces;
a first face, which is substantially perpendicular to said top face, for facing the exterior of the building; and
a second face, which is substantially parallel to the first face, for facing the interior of the building;
said interior volume including first, second and third compartments,
said first compartment being formed in part by said first face so that the first compartment is an exterior facing compartment, said second compartment being formed in part by said second face so that the second compartment is an interior facing compartment, and said third compartment being between said first and second compartments, wherein:
said first compartment is substantially filled and sealed with a translucent insulating material so as to form a lens;
said third compartment is substantially filled and sealed with a heat-absorbing material and includes a volume for allowing for expansion of the heat-absorbing material; and
the first face, second face, and a third face, which is between said first and third compartments and is substantially parallel to the first face, are clear or translucent.

34. A solar heating block as claimed in claim 33, wherein said translucent insulating material is aerogel.

35. A solar heating block as claimed in claim 34, wherein said aerogel is hydrophobic.

36. A solar heating block as claimed in claim 33, wherein said translucent insulating material is white fiberglass.

37. A solar heating block as claimed in claim 33, wherein said translucent insulating material is fumed silica.

38. A solar heating block as claimed in claim 33, wherein said heat-absorbing material is water.

39. A solar heating block as claimed in claim 38, wherein said water is dyed.

40. A solar heating block as claimed in claim 38, wherein said water includes a gelling agent.

41. A solar heating block as claimed in claim 40, wherein said gelling agent includes methylcellulose.

42. A solar heating block as claimed in claim 33, wherein said heat-absorbing material includes antifreeze.

43. A solar heating block as claimed in claim 33, wherein said heat-absorbing material includes antimicrobial agents.

44. A solar heating block as claimed in claim 33, wherein said heat-absorbing material includes phase-change material.

45. A solar heating block as claimed in claim 33, wherein said second compartment contains a translucent insulating material.

46. A solar heating block as claimed in claim 45, wherein said translucent insulating material is aerogel.

47. A solar heating block as claimed in claim 46, wherein said aerogel is hydrophobic.

48. A solar heating block as claimed in claim 45, wherein said translucent insulating material is white fiberglass.

49. A solar heating block as claimed in claim 45, wherein said translucent insulating material is fumed silica.

50. A solar heating block as claimed in claim 33, wherein said second compartment contains a heat-absorbing material.

51. A solar heating block as claimed in claim 50, wherein said heat-absorbing material is water.

52. A solar heating block as claimed in claim 51, wherein said water is dyed.

53. A solar heating block as claimed in claim 51, wherein said water includes a gelling agent.

54. A solar heating block as claimed in claim 53, wherein said gelling agent includes methylcellulose.

55. A solar heating block as claimed in claim 50, wherein said heat-absorbing material includes antifreeze.

56. A solar heating block as claimed in claim 50, wherein said heat-absorbing material includes antimicrobial agents.

57. A solar heating block as claimed in claim 50, wherein said heat-absorbing material includes phase-change material.

58. A solar heating block as claimed in claim 33, wherein said second face is clear.

59. A solar heating block as claimed in claim 33, wherein said second face is frosted.

60. A solar heating block as claimed in claim 33, wherein said second face is patterned.

61. A solar heating block as claimed in claim 33, further comprising a diffuser plate, said diffuser plate being adapted to diffuse light passing therethrough, said diffuser plate being disposed within said third compartment and adjacent therein to said second compartment.

62. A solar heating block as claimed in claim 61, wherein said diffuser plate is a wall separating said second compartment from said third compartment.

63. A solar heating block as claimed in claim 61, wherein said diffuser plate is adjacent to a wall separating said second compartment from said third compartment.

64. A solar heating block as claimed in claim 33, further comprising a heat-absorbing grid, said heat-absorbing grid being within said third compartment and being perforated to have an open area between 20% and 50% of the total area thereof, said heat-absorbing grid having a first side and a second side, said first side being of a dark color and said second side being of a light color, said heat-absorbing grid being disposed so that said first side faces said first compartment and said second side faces said second compartment.

65. A solar heating block as claimed in claim 64, wherein said dark color of said first side of said heat-absorbing grid is black.

66. A solar heating block as claimed in claim 64, wherein said light color of said second side of said heat-absorbing grid is white.

67. A solar heating block as claimed in claim 64, wherein said heat-absorbing grid is adjacent to said first compartment within said third compartment.

68. A solar heating block as claimed in claim 64, wherein said heat-absorbing grid is adjacent to said second compartment within said third compartment.

69. A solar heating block as claimed in claim 33, wherein said block is of an acrylic plastic.

70. A solar heating block as claimed in claim 33, wherein
a top of said solar heating block has a narrowed portion, extending away from said bottom face, creating said volume for said expansion;
said narrowed portion being said third compartment extending above said first and second compartments, and
a bottom of said solar heating block has an indented portion, said indented portion being said first and second compartments extending below said third compartment, so that said narrowed portion may fit into the indented portion of a second solar heating block vertically stacked thereabove, and so that said narrowed portion is hidden from view of an observer on either side of the stacked blocks.

71. A solar heating block as claimed in claim 33, wherein said translucent insulating material is compressed within said first compartment to prevent the settling of said translucent insulating material therein.

72. A solar heating block as claimed in claim 45, wherein said translucent insulating material is compressed within said second compartment to prevent the settling of said translucent insulating material therein.

73. A solar heating block as claimed in claim 33, further comprising a fabric tile on said second face thereof.

74. A solar heating block as claimed in claim 73, further comprising a translucent felt insulating pad between said fabric tile and said second face of said solar heating block.

75. A block for a panel for covering at least a portion of a building wall opening on a side of the building substantially unexposed to direct solar radiation,
said block being an insulating, light-diffusing block and having an interior volume defined within:
a top face and a bottom face which is substantially parallel thereto, wherein said block is stackable along said top and bottom faces;
a first face, which is substantially perpendicular to said top face, for facing the exterior of the building: and
a second face, which is substantially parallel to the first face, for facing the interior of the building;
said interior volume including first, second and third compartments,
said first compartment being formed in part by said first face so that the first compartment is an exterior facing compartment, said second compartment being formed in part by said second face so that the second compartment is an interior facing compartment, and said third compartment being between said first and second compartments, wherein:
said first compartment and said second compartment are substantially filled and sealed with a translucent insulating material; and
the first face, second face, and a third face, which is between said first and second compartments and is substantially parallel to the first face, are clear or translucent.

76. A block as claimed in claim 75, wherein said translucent insulating material is aerogel.

77. A block as claimed in claim 76, wherein said aerogel is hydrophobic.

78. A block as claimed in claim 75, wherein said translucent insulating material is white fiberglass.

79. A block as claimed in claim 75, wherein said translucent insulating material is fumed silica.

80. A block as claimed in claim 75, wherein said third compartment contains a translucent insulating material.

81. A block as claimed in claim 80, wherein said translucent insulating material is aerogel.

82. A block as claimed in claim 81, wherein said aerogel is hydrophobic.

83. A block as claimed in claim 80, wherein said translucent insulating material is white fiberglass.

84. A block as claimed in claim 80, wherein said translucent insulating material is fumed silica.

85. A block as claimed in claim 75, wherein said second face is clear.

86. A block as claimed in claim 75, wherein said second face is frosted.

87. A block as claimed in claim 75, wherein said second face is patterned.

88. A block as claimed in claim 75, wherein said block is of an acrylic plastic.

89. A block as claimed in claim 75, wherein
a top of said block has a narrowed portion, extending away from said bottom face;
said narrowed portion being said third compartment extending above said first and second compartments; and a bottom of said block has an indented portion, said intended portion being said first and second compartments extending below said third compartment, so that said narrowed portion may fit into the indented portion of a second block vertically stacked thereabove, and so that said narrowed portion is hidden from view of an observer on either side of the stacked blocks.

90. A block as claimed in claim 75, wherein said translucent insulating material is compressed within said first compartment to prevent the settling of said translucent insulating material therein.

91. A block as claimed in claim 75, wherein said translucent insulating material is compressed within said second compartment to prevent the settling of said translucent insulating material therein.

92. A block as claimed in claim 75, further comprising a fabric tile on said second face thereof.

93. A block as claimed in claim 92, further comprising a translucent felt insulating pad between said fabric tile and said second face of said block.

94. The solar heating block of claim 24, wherein said contoured portion is defined by a pair of feet running across the bottom of the block.

\* \* \* \* \*

UNITED STATES PATENT AND TRADEMARK OFFICE
CERTIFICATE OF CORRECTION

| | | |
|---|---|---|
| PATENT NO. | : 8,082,916 B2 | |
| APPLICATION NO. | : 12/226078 | |
| DATED | : December 27, 2011 | |
| INVENTOR(S) | : Wendell B. Colson | |

It is certified that error appears in the above-identified patent and that said Letters Patent is hereby corrected as shown below:

On the Title Page: Item (73) Assignee:

The assignee reads -- Hunter Douglas Industries B.V. --

The assignee should read -- Hunter Douglas Inc. --

Signed and Sealed this
Twenty-fifth Day of December, 2012

David J. Kappos
*Director of the United States Patent and Trademark Office*